United States Patent
Choi et al.

(10) Patent No.: US 11,402,955 B2
(45) Date of Patent: Aug. 2, 2022

(54) ELECTRONIC DEVICE

(71) Applicant: Samsung Display Co., Ltd., Yongin-si (KR)

(72) Inventors: Jaeuk Choi, Seoul (KR); Yun-Ho Kim, Hwaseong-si (KR); Chul Kim, Hwaseong-si (KR); Hye-Seok Na, Hwaseong-si (KR); Soojung Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/249,012

(22) Filed: Feb. 17, 2021

(65) Prior Publication Data

US 2021/0397298 A1 Dec. 23, 2021

(30) Foreign Application Priority Data

Jun. 22, 2020 (KR) ........................ 10-2020-0075877

(51) Int. Cl.
*G06F 3/044* (2006.01)

(52) U.S. Cl.
CPC .......... G06F 3/0443 (2019.05); G06F 3/0446 (2019.05); *G06F 2203/04112* (2013.01)

(58) Field of Classification Search
CPC ................ G06F 3/0443; G06F 3/0446; G06F 2203/04112; G06F 3/0418; G06F 3/0448; G06F 3/0412; G06F 3/044; G06F 2203/04111
See application file for complete search history.

(56) References Cited

U.S. PATENT DOCUMENTS

| | | | |
|---|---|---|---|
| 8,410,795 B1 | 4/2013 | Peng et al. | |
| 8,711,105 B2 | 4/2014 | Gray et al. | |
| 9,075,484 B2 | 7/2015 | Ritter et al. | |
| 10,067,615 B2 | 9/2018 | Kim et al. | |
| 10,852,896 B2 * | 12/2020 | Nakayama | G06F 3/0445 |
| 10,891,008 B2 * | 1/2021 | Lee | G09G 3/3291 |

(Continued)

FOREIGN PATENT DOCUMENTS

| | | |
|---|---|---|
| EP | 3276470 A1 | 1/2018 |
| EP | 3336667 A1 | 6/2018 |

(Continued)

*Primary Examiner* — Amy Onyekaba
(74) *Attorney, Agent, or Firm* — Lewis Roca Rothgerber Christie LLP

(57) ABSTRACT

An electronic device includes a display layer and a sensor layer on the display layer. The sensor layer includes an electrode and a cross electrode. The electrode includes a plurality of first portions spaced from each other in a first direction and a plurality of second portions between the plurality of first portions. The cross electrode includes a plurality of first cross portions spaced from each other in a second direction crossing the first direction and a plurality of second cross portions between the plurality of first cross portions. The second portion includes a first pattern portion extending in the first direction and a plurality of second pattern portions extending in the second direction. A first opening is in the plurality of first portions, a second opening is in the first pattern portion, and a size of the first opening is greater than a size of the second opening.

26 Claims, 22 Drawing Sheets

(56) References Cited

U.S. PATENT DOCUMENTS

| | | | |
|---|---|---|---|
| 2011/0063249 A1* | 3/2011 | Chou | G06F 3/0446 345/174 |
| 2014/0054070 A1* | 2/2014 | Ichiki | H05K 1/0274 174/253 |
| 2014/0078104 A1* | 3/2014 | Lee | G06F 3/0446 345/174 |
| 2014/0111709 A1* | 4/2014 | Kim | G02F 1/13338 349/12 |
| 2014/0152579 A1* | 6/2014 | Frey | G06F 3/0416 345/173 |
| 2014/0152916 A1* | 6/2014 | Nakamura | G06F 3/0445 349/12 |
| 2014/0152917 A1* | 6/2014 | Lee | G06F 1/1692 174/250 |
| 2014/0225859 A1 | 8/2014 | Badaye et al. | |
| 2014/0299357 A1* | 10/2014 | Nakamura | G06F 3/047 174/250 |
| 2015/0042598 A1* | 2/2015 | Chae | G06F 3/0446 345/174 |
| 2015/0077650 A1* | 3/2015 | Huang | G06F 3/0445 29/842 |
| 2015/0242010 A1 | 8/2015 | Cok | |
| 2016/0018915 A1* | 1/2016 | Kuo | G06F 3/0443 345/173 |
| 2016/0103517 A1* | 4/2016 | Kang | G06F 3/0412 345/174 |
| 2016/0103520 A1* | 4/2016 | Kim | G06F 3/0445 345/174 |
| 2016/0132153 A1* | 5/2016 | Lin | G06F 3/0446 345/174 |
| 2016/0216806 A1* | 7/2016 | Nakamura | G06F 3/0448 |
| 2017/0147107 A1* | 5/2017 | Ishizaki | G06F 3/0445 |
| 2018/0197924 A1* | 7/2018 | Tada | G06F 3/0443 |
| 2018/0224968 A1* | 8/2018 | Church | G06F 3/0448 |
| 2018/0232070 A1 | 8/2018 | Katsurahira | |
| 2018/0321763 A1* | 11/2018 | Liu | G06F 3/047 |
| 2018/0348932 A1* | 12/2018 | Lee | G06F 3/0412 |
| 2019/0056816 A1* | 2/2019 | Hsu | G06F 3/0445 |
| 2019/0064960 A1* | 2/2019 | Na | G06F 3/0446 |
| 2019/0079633 A1* | 3/2019 | Kim | G06F 3/0418 |
| 2019/0102017 A1* | 4/2019 | Kim | G06F 3/0412 |
| 2019/0138138 A1* | 5/2019 | Nakayama | G06F 3/0448 |
| 2019/0179435 A1* | 6/2019 | Yuan | G06F 3/0412 |
| 2019/0227672 A1* | 7/2019 | Nishimura | G06F 3/0448 |
| 2019/0377457 A1* | 12/2019 | Nakayama | G06F 3/0448 |
| 2020/0064968 A1* | 2/2020 | Kim | H01L 27/3276 |
| 2020/0089369 A1* | 3/2020 | Bang | G06F 3/0448 |
| 2020/0117295 A1* | 4/2020 | Nakayama | H01B 5/14 |
| 2020/0117304 A1* | 4/2020 | Lee | G06F 3/0412 |
| 2020/0125203 A1* | 4/2020 | Kim | G06F 3/0443 |
| 2020/0133438 A1* | 4/2020 | Kim | G06F 3/0448 |
| 2020/0159369 A1* | 5/2020 | Seo | G06F 3/045 |
| 2020/0168671 A1* | 5/2020 | Jang | H01L 27/326 |
| 2020/0173949 A1* | 6/2020 | Lee | G01N 27/24 |
| 2020/0192525 A1* | 6/2020 | Li | G06F 3/0446 |
| 2021/0149525 A1* | 5/2021 | Xu | G06F 3/0446 |
| 2021/0232268 A1* | 7/2021 | Dattalo | G06F 3/0446 |
| 2021/0255731 A1 | 8/2021 | Kim et al. | |
| 2021/0365152 A1* | 11/2021 | Xu | G06F 3/0412 |

FOREIGN PATENT DOCUMENTS

| | | |
|---|---|---|
| EP | 3657308 A1 | 5/2020 |
| GB | 2559571 A | 8/2018 |
| KR | 10-2037515 B1 | 10/2019 |
| KR | 10-2021-0104399 | 8/2021 |

* cited by examiner

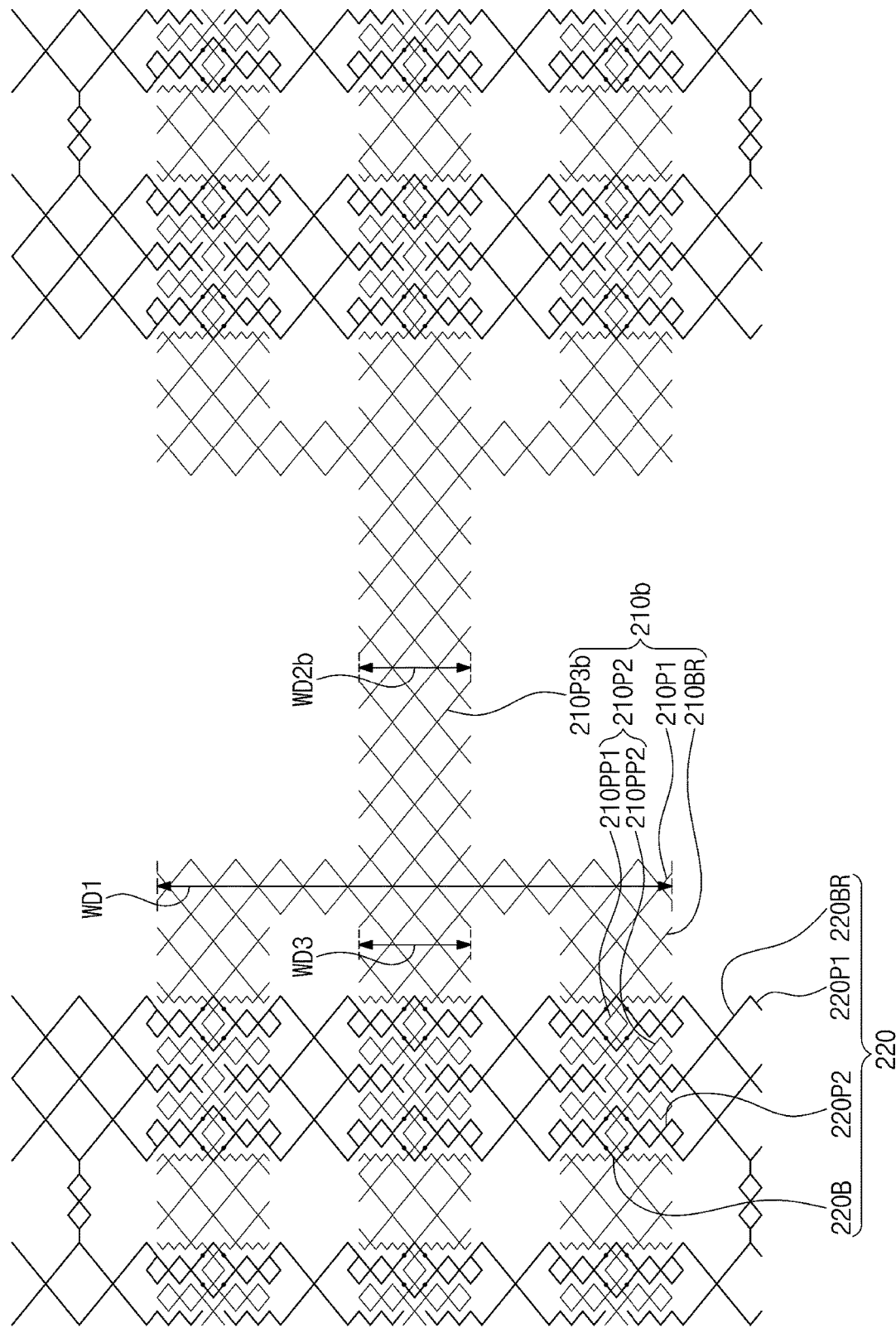

ELECTRONIC DEVICE

CROSS-REFERENCE TO RELATED APPLICATION

This application claims priority to and the benefit of Korean Patent Application No. 10-2020-0075877, filed on Jun. 22, 2020, in the Korean Intellectual Property Office (KIPO), the entire contents of which are hereby incorporated by reference.

BACKGROUND

1. Field

The present disclosure herein relates to an electric device having improved sensing sensitivity.

2. Description of Related Art

Electronic devices may sense an external input applied from the outside of the electronic devices. The external input may be a user's input. The user's input may include various types of external inputs such as a portion of user's body, light, heat, a pen, a pressure, or the like. The electronic devices may recognize coordinates of the pen using an electromagnetic resonance (EMR) method or may recognize the coordinates of the pen using an active electrostatic (AES) method.

SUMMARY

Aspects of one or more embodiments of the present disclosure are directed towards an electronic device having improved sensing sensitivity.

An embodiment of the inventive concept provides an electronic device including: a display layer; and a sensor layer on the display layer, the sensor layer including an electrode and a cross electrode crossing the electrode. In an embodiment, the electrode may include a plurality of first portions spaced from each other in a first direction and a plurality of second portions between the plurality of first portions, the cross electrode may include a plurality of first cross portions spaced from each other in a second direction crossing the first direction and a plurality of second cross portions between the plurality of first cross portions, the plurality of second portions may include a first pattern portion extending in the first direction and a plurality of second pattern portions extending in the second direction, a first opening may be in the plurality of first portions, a second opening may be in the first pattern portion, and a size of the first opening may be greater than a size of the second opening.

In an embodiment, the plurality of first portions, the plurality of second portions, the plurality of first cross portions, and the plurality of second cross portions may have a mesh structure.

In an embodiment, the plurality of second cross portions may include: a plurality of first cross pattern portions adjacent to one side of one of the plurality of first cross portions, the plurality of first cross pattern portions extending in the second direction; and a plurality of second cross pattern portions adjacent to an other side of an other one of the plurality of first cross portions, the plurality of second cross pattern portions extending in the second direction.

In an embodiment, the plurality of first cross pattern portions and the plurality of second pattern portions may be alternately arranged in the first direction, and the plurality of second cross pattern portions and the plurality of second pattern portions may be alternately arranged in the first direction.

In an embodiment, the cross electrode may further include a bridge pattern at a different layer than the plurality of first cross portions and the plurality of second cross portions, and the bridge pattern may overlap the first pattern portion in a plan view.

In an embodiment, a plurality of first pattern openings may be in the plurality of first cross pattern portions, and the plurality of first pattern openings are different in size from each other.

In an embodiment, the plurality of first cross pattern portions and the second cross pattern portions may be symmetrical to each other with respect to an axis extending in the first direction.

In an embodiment, the plurality of second cross portions may be interdigitated with the plurality of second pattern portions.

In an embodiment, the plurality of second pattern portions may be symmetrical to each other with respect to an axis extending in the second direction.

In an embodiment, the plurality of second cross portions may include a first cross pattern portion and a second cross pattern portion spaced from the first cross pattern portion with one of the plurality of second pattern portions therebetween, and the first cross pattern portion and the second cross pattern portion are different in shape from each other.

In an embodiment, the display layer may include a plurality of emission areas, and the second opening may overlap at least four or more emission areas of the plurality of emission areas in a plan view.

In an embodiment, the plurality of second cross portions may do not overlap the second opening in a plan view.

In an embodiment, a third opening may be in the plurality of second cross portions, and the plurality of second portions may do not overlap the third opening in the plan view.

In an embodiment, the plurality of second pattern portions may protrude from the first pattern portion in the second direction.

In an embodiment, the electrode may further include a plurality of branch portions branched from the first portions, and the plurality of branch portions may be spaced from each other with the plurality of second portions therebetween.

In an embodiment, the electrode may further include a plurality of third portions, spaced from the plurality of second portions with the plurality of first portions therebetween, and each of the plurality of third portions may have the same width as each of the plurality of branch portions.

In an embodiment, the electrode may further include a plurality of third portions, spaced from the plurality of second portions with the plurality of first portions therebetween, and each of the plurality of third portions may have a width less than that of each of the plurality of first portions.

In an embodiment, the cross electrode may further include: a plurality of first cross branch portions branched from the first cross portions; a plurality of second cross branch portions between the plurality of second cross portions; and a plurality of third cross branch portions between the plurality of second cross branch portions.

In an embodiment, the plurality of third cross branch portions may be adjacent to the plurality of branch portions.

In an embodiment of the inventive concept, an electronic device includes: a display layer; and a sensor layer on the display layer, the sensor layer including an electrode and a cross electrode crossing the electrode. In an embodiment, a first region, a second region adjacent to the first region in a first direction, and a third region adjacent to the first region in a second direction crossing the first direction may be in the sensor layer, the electrode and the cross electrode cross each other in the first region and are insulated from each other, a first opening may be in a first portion of the electrode located in the first region, and a size of a second opening is greater than a size of the first opening, and the second opening may be in a second portion of the electrode located in the second region.

In an embodiment, a third opening may be in a third portion of the cross electrode located in the first region, and a size of a fourth opening is greater than a size of the third opening, and the fourth opening may be in a fourth portion of the cross electrode located in the third region.

In an embodiment, the first portion of the electrode may include: a first pattern portion extending in the first direction; and a plurality of second pattern portions extending from the first pattern portion in the second direction.

In an embodiment, the third portion of the cross electrode may include: a plurality of first cross pattern portions adjacent to the cross electrode disposed in the third region to extend in the second direction; and a plurality of second cross pattern portions spaced from each other in the second direction with the plurality of first cross pattern portion and the first pattern portions therebetween.

In an embodiment, the plurality of first cross pattern portions may be spaced from each other in the first direction with the plurality of second pattern portions therebetween, and the plurality of second cross pattern portions may be spaced from each other in the first direction with the plurality of second pattern portions therebetween.

In an embodiment, the third portion of the cross electrode may further include a bridge pattern, and the bridge pattern may overlap the first pattern portion in a plan view.

In an embodiment, the third portion of the cross electrode may not overlap the first opening in a plan view.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept.

In the drawings:

FIG. 7D is a plan view of the area 200U1 of FIG. 4 according to an embodiment of the inventive concept;

DETAILED DESCRIPTION

Figure 1:
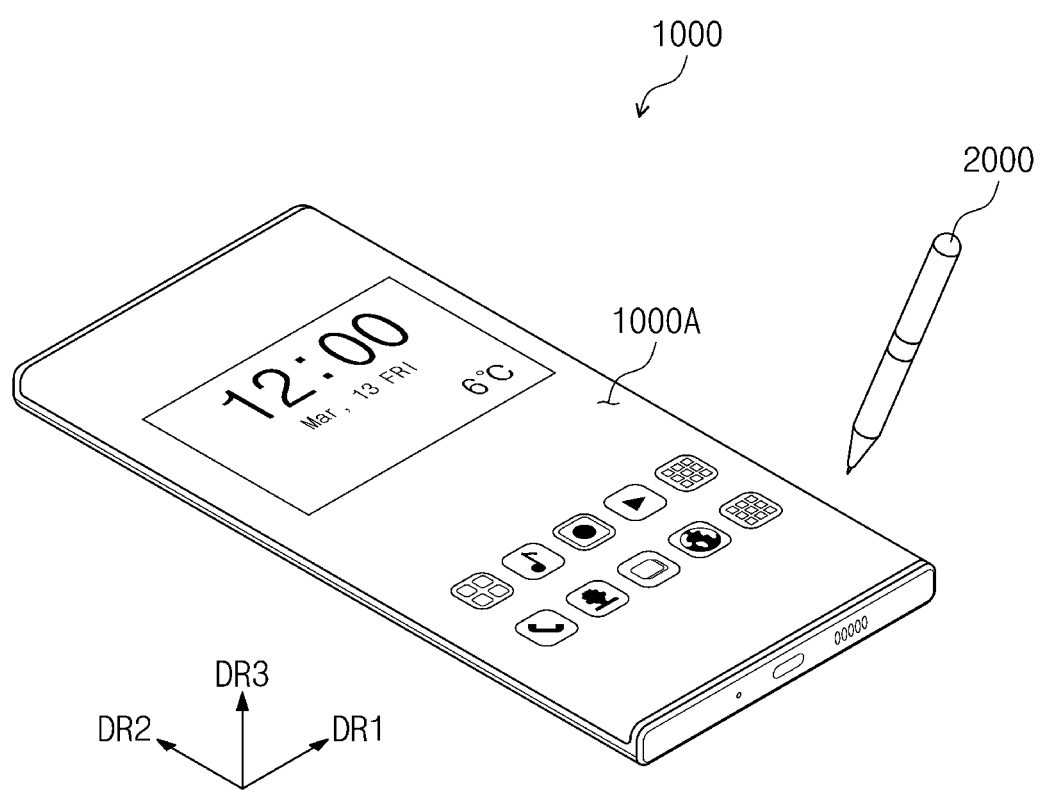
FIG. 1 is a perspective view of an electronic device according to an embodiment of the inventive concept.

In this specification, it will also be understood that when one component (or region, layer, portion) is referred to as being "on", "connected to", or "coupled to" another component, it can be directly disposed/connected/coupled on/to the one component, or an intervening third component may also be present.

Like reference numerals refer to like elements throughout. Also, in the figures, the thickness, ratio, and dimensions of components may be exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Spatially relative terms, such as "beneath," "below," "lower," "above," "upper," "bottom," "top," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art.

As used herein, expressions such as "at least one of," "one of," and "selected from," when preceding a list of elements, modify the entire list of elements and do not modify the individual elements of the list.

Further, the use of "may" when describing embodiments of the present disclosure refers to "one or more embodiments of the present disclosure".

Unless otherwise defined, all terms (including technical and scientific terms) used herein have the same meaning as commonly understood by a person of ordinary skill in the art to which this disclosure pertains. Also, terms such as defined terms in commonly used dictionaries are to be interpreted as having meanings consistent with meaning in the context of the relevant art and are expressly defined herein unless interpreted in an ideal or overly formal sense.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, exemplary embodiments of the inventive concept will be described with reference to the accompanying drawings.

FIG. 1 is a perspective view of an electronic device according to an embodiment of the inventive concept.

Referring to FIG. 1, an electronic device 1000 may be a device that is activated according to an electrical signal. For example, the electronic device 1000 may be a mobile phone, a tablet PC, a car navigation system, a game console, or a wearable device, but is not limited thereto. FIG. 1 illustrates an example in which the electronic device 1000 is provided as the mobile phone.

The electronic device 1000 may display an image through an active area 1000A. The active area 1000A may include a surface defined by a first direction DR1 and a second direction DR2. A thickness direction of the electronic device 1000 may be parallel to a third direction DR3 crossing the first direction DR1 and the second direction DR2. Thus, a front surface (or top surface) and a rear surface (or bottom surface) of each of members constituting the electronic device 1000 may be defined based on the third direction DR3. For example, the front surface (or the top surface) and the rear surface (or the bottom surface) of each of members constituting the electronic device 1000 may be opposite each other in the third direction DR3.

An electronic device 1000 may sense inputs applied from the outside thereof. The external inputs may be user's inputs. The user's inputs may include various types of external inputs such as a portion of the user's body, an active pen 2000, light, heat, or pressure.

The electronic device 1000 illustrated in FIG. 1 may sense an input by a user's touch and an input by the active pen 2000. The electronic device 1000 and the active pen 2000 may perform bidirectional communication. The electronic device 1000 may provide an uplink signal to the active pen 2000. For example, the uplink signal may include a synchronization signal or information of the electronic device 1000, but is not particularly limited thereto. The active pen 2000 may provide a downlink signal to the electronic device 1000. The downlink signal may include a synchronization signal or state information of the active pen 2000. For example, the downlink signal includes coordinate information of the active pen 2000, battery information of the active pen 2000, inclination information of the active pen 2000, and/or various information stored in or relating to the active pen 2000, but is not particularly limited thereto.

Figure 2:
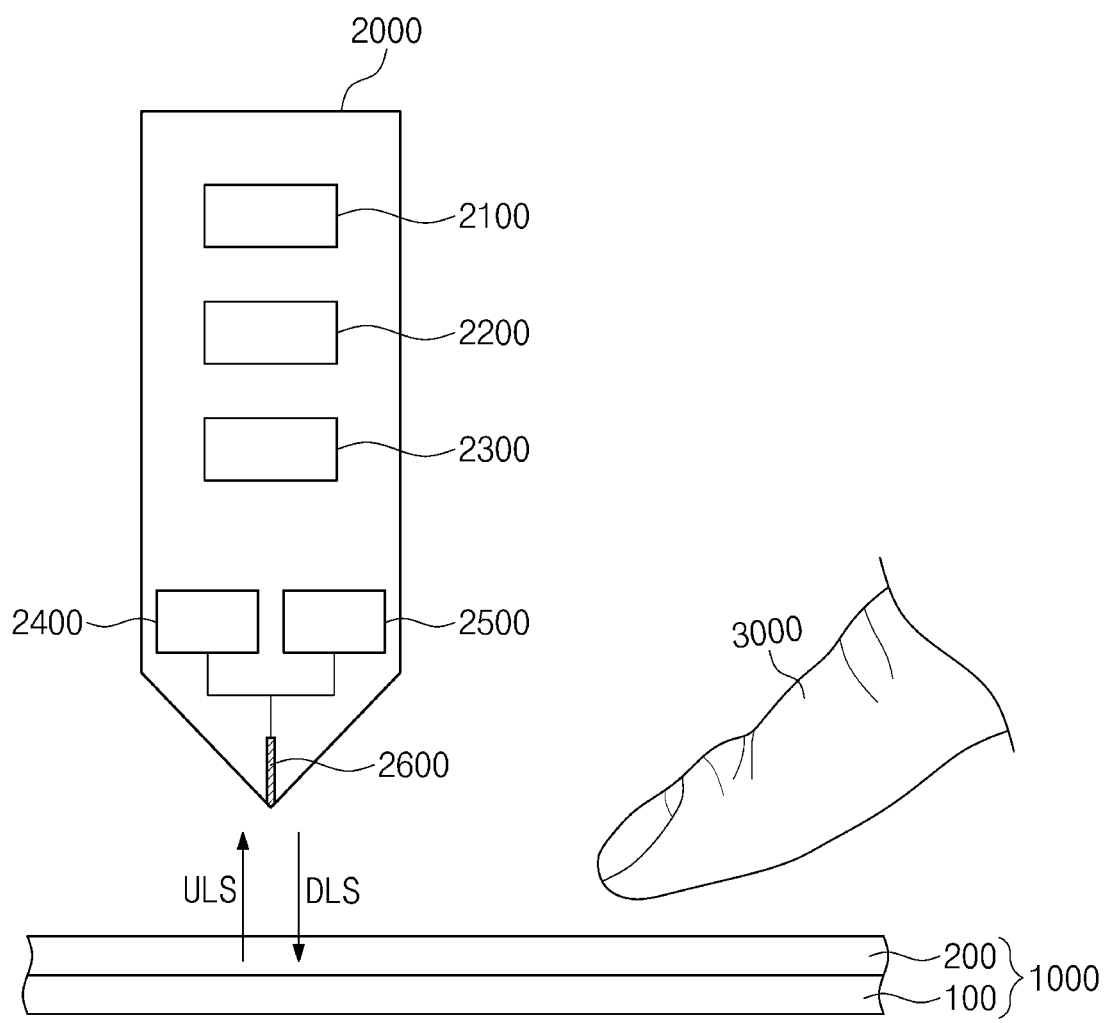
FIG. 2 is a schematic block diagram illustrating an electronic device and an active pen according to an embodiment of the inventive concept.

FIG. 2 is a schematic block diagram illustrating the electronic device and the active pen according to an embodiment of the inventive concept.

Referring to FIG. 2, the electronic device 1000 may include a display layer 100 and a sensor layer 200.

The display layer 100 may be configured to generate or substantially generate an image. The display layer 100 may be an emission-type display layer. For example, the display layer 100 may be an organic light emitting display layer, a quantum dot display layer, a micro LED display layer, or a nano LED display layer.

The sensor layer 200 may be disposed on the display layer 100. The sensor layer 200 may sense an external input applied from the outside. The sensor layer 200 may sense both an input by the user's body 3000 and an input by the active pen 2000.

The sensor layer 200 may operate by time-division driving. For example, the sensor layer 200 may be driven repeatedly alternately in a first mode and a second mode. The first mode may be a mode for sensing the input by the user's body 3000, and the second mode may be a mode for sensing the input by the active pen 2000.

When the second mode starts, the sensor layer 200 may provide an uplink signal ULS to the active pen 2000. When the active pen 2000 receives the uplink signal ULS and is synchronized with the electronic device 1000, the active pen 2000 may provide a downlink signal DLS to the sensor layer 200.

The active pen 2000 may include a power supply 2100, a memory 2200, a control unit 2300, a transmission unit 2400, a reception unit 2500, and an electrode 2600. However, the components constituting the active pen 2000 are not limited to the components listed above. For example, the active pen 2000 may further include an electrode switch for converting the electrode 2600 to a signal transmission mode or a signal reception mode, a pressure sensor for sensing a pressure, a rotation sensor for sensing rotation, or the like.

The power supply 2100 may include a battery or a high-capacity capacitor that supplies power to the active pen 2000. The memory 2200 may store function information of the active pen 2000. The control unit 2300 may control an operation of the active pen 2000. Each of the transmission unit 2400 and the reception unit 2500 may communicate with the electronic device 1000 through the electrode 2600. The transmission unit 2400 may be referred to as a signal generator or a transmission circuit, and the reception unit 2500 may be referred to as a signal receiver or a reception circuit.

Figure 3:
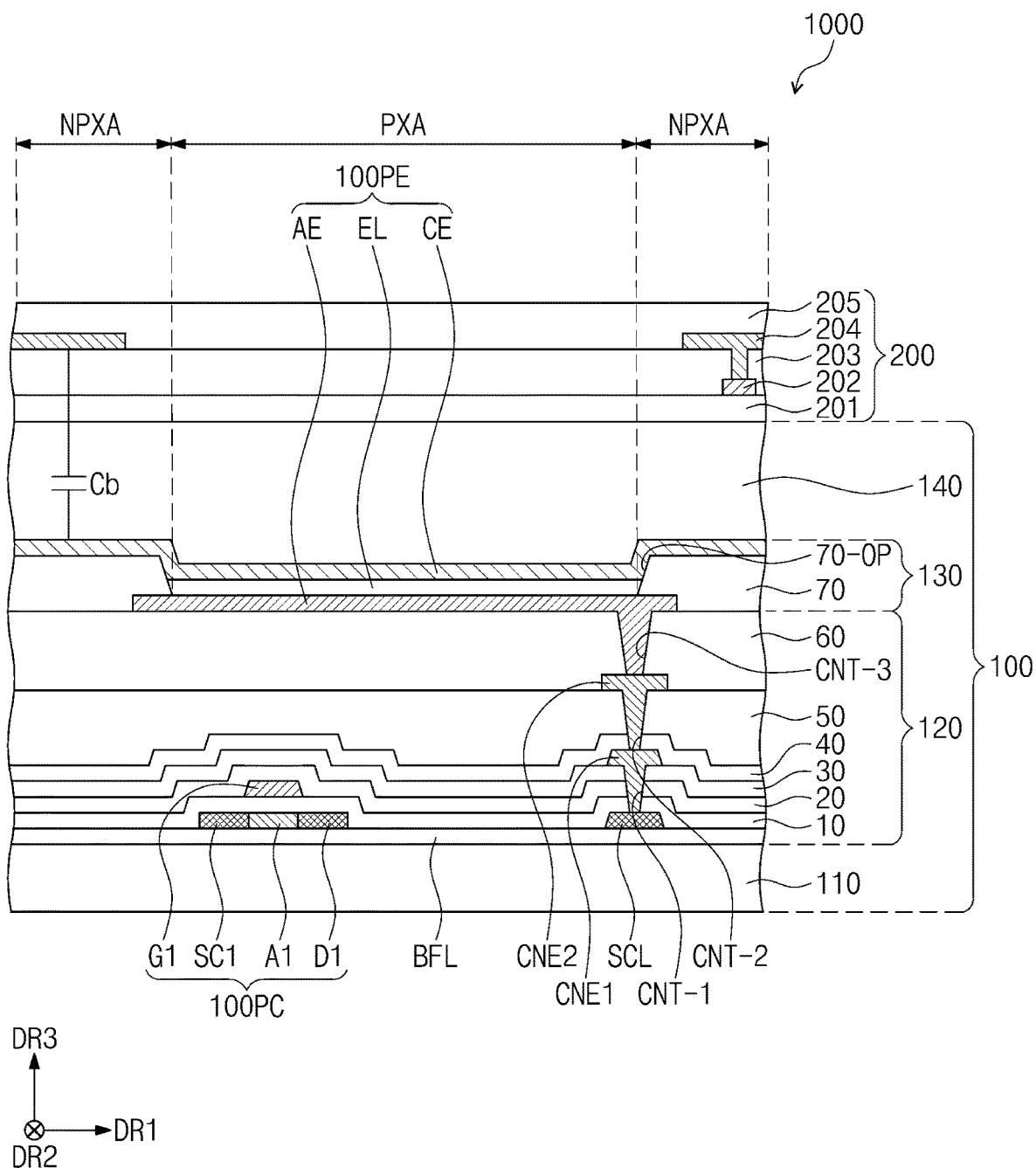
FIG. 3 is a cross-sectional view of an electronic device according to an embodiment of the inventive concept.

FIG. 3 is a cross-sectional view of an electronic device according to an embodiment of the inventive concept.

Referring to FIG. 3, the display layer 100 may include a base layer 110, a circuit layer 120, a light emitting element layer 130, and an encapsulation layer 140.

The base layer 110 may be a member that provides a base surface on which a circuit layer 120 is disposed. The base layer 110 may be a glass substrate, a metal substrate, or a polymer substrate. However, the embodiment of the inventive concept is not limited thereto. For example, the base layer 110 may be an inorganic layer, an organic layer, or a composite layer.

The base layer 110 may have a multilayer structure. For example, the base layer 110 includes a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer. Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In this specification, the "~~"-based resin refers to including a functional group of "~~".

The circuit layer 120 may be disposed on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating or vapor deposition (i.e., through a process including, for example, coating or vapor deposition), and then, the insulating layer, the semiconductor layer, and the conductive layer may be selectively patterned through a plurality of photolithography processes. Thereafter, the semiconductor pattern, the conductive pattern, and the signal line included in the circuit layer 120 may be provided.

At least one inorganic layer may be disposed on a top surface of the base layer 110. The inorganic layer may include at least one of aluminum oxide, titanium oxide, silicon oxide silicon oxynitride, zirconium oxide, or hafnium oxide. The inorganic layer may be provided as a multilayer. The multilayer inorganic layer may constitute a barrier layer and/or a buffer layer. In this embodiment, the display layer 100 is illustrated as including a buffer layer BFL.

The buffer layer BFL may improve bonding force between the base layer 110 and the semiconductor pattern. The buffer layer BFL may include a silicon oxide layer and a silicon nitride layer, and the silicon oxide layer and the silicon nitride layer may be alternately laminated. For example, the silicon oxide layer and the silicon nitride layer may be alternately laminated in the third direction DR3.

The semiconductor pattern may be disposed on the buffer layer BFL. The semiconductor pattern may include poly-silicon. However, the embodiment of the inventive concept is not limited thereto. For example, the semiconductor pattern may include amorphous silicon or metal oxide.

FIG. 3 illustrates a portion of the semiconductor pattern. For example, the semiconductor pattern may be further disposed on other areas. The semiconductor pattern may be arranged in accordance with a specific rule over pixels. The semiconductor pattern has different electrical properties depending on whether the semiconductor pattern is doped. The semiconductor pattern may include a first region having high conductivity and a second region having low conductivity. The first region may be doped with an N-type dopant or a P-type dopant. A P-type transistor may include a doped region doped with the P-type dopant, and an N-type transistor may include a doped region doped with the N-type dopant. The second region may be a non-doped region or may be doped at a concentration less than that of the first region.

The first region may have conductivity greater than that of the second region and may serve or substantially serve as an electrode or a signal line. The second region may correspond or substantially correspond to an active region (or channel) of the transistor. That is, a portion of the semiconductor pattern may be an active region of the transistor, another portion may be a source or drain of the transistor, and further another portion may be a connection electrode or a connection signal line.

Each of the pixels may have an equivalent circuit including seven transistors, one capacitor, and a light emitting element, and an equivalent circuit diagram of the pixel may be modified in various suitable forms as those of ordinary skill in the art may appreciate. In FIG. 3, one transistor 100PC and a light emitting device (or light emitting element 100PE) included in the pixel are exemplarily illustrated.

A source SC1, an active region A1, and a drain D1 of the transistor 100PC may be provided from the semiconductor pattern. The source SC1 and the drain D1 may extend in opposite directions from the active region A1 on a cross-section. FIG. 3 illustrates a portion of a connection signal line SCL formed from the semiconductor pattern. In one or more embodiments, the connection signal line SCL may be connected to the drain D1 of the transistor 100PC on the plane or in a plan view.

The first insulating layer 10 may be disposed on the buffer layer BFL. The first insulating layer 10 commonly overlaps the plurality of pixels PX to cover the semiconductor pattern. The first insulating layer 10 may include an inorganic layer and/or an organic layer and have a single-layer or multilayer structure. The first insulating layer 10 may include at least one of oxide, titanium oxide, silicon oxide, silicon oxide nitride, zirconium oxide, or hafnium oxide. In this embodiment, the first insulating layer 10 may include a single-layer silicon oxide layer. The insulating layer of the circuit layer 120, which may be described in more detail below, as well as the first insulating layer 10 may be an inorganic layer and/or an organic layer and may have a single-layer or a multilayer structure. The inorganic layer may include at least one of the above-described materials, but is not limited thereto.

A gate G1 is disposed on the first insulating layer 10. Each of the gate G1 may be a portion of a metal pattern. The gate G1 overlaps the active region A1. In the process in which the semiconductor pattern is doped, the gate G1 may function as a mask.

The second insulating layer 20 may be disposed on the first insulating layer 10 to cover the gate G1. The second insulating layer 20 may commonly overlap the pixels. The second insulating layer 20 may be an inorganic layer and/or an organic layer and have a single-layer or multilayer structure. In this embodiment, the first insulating layer 10 may include a single-layer silicon oxide layer.

The third insulating layer 30 may be disposed on the second insulating layer 20. In this embodiment, the third insulating layer 30 may be a single-layer silicon oxide layer.

A first connection electrode CNE1 may be disposed on the third insulating layer 30. The first connection electrode CNE1 may be connected to the signal line SCL through a contact hole CNT-1 passing through the first to third insulating layers (i.e., the first insulating layer 10, the second insulating layer 20, and the third insulating layer 30).

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer. A light emitting element layer 130 may be disposed on the circuit layer 120. The light emitting element layer 130 may include a light emitting element. For example, the light emitting element layer 130 may include an organic light emitting material, quantum dots, quantum rods, a micro LED, or a nano LED. The light emitting element 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60.

A pixel defining layer 70 may be disposed on the sixth insulating layer 60 to cover a portion of the first electrode AE. An opening 70-OP may be defined in the pixel defining layer 70. The opening 70-OP of the pixel defining layer 70 may expose at least a portion of the first electrode AE. In this embodiment, an emission area PXA may be defined to correspond to a portion of an area of the first electrode AE that is exposed by the opening 70-OP. A non-emission area NPXA may surround the emission area PXA.

The emission layer EL may be disposed on the first electrode AE. The emission layer EL may be disposed in the opening 70-OP. That is, separate emission layers EL spaced from each other, and each of the emission layers EL may be disposed on a corresponding one of each of the pixels. When the emission layer EL is disposed separately for each of the pixels, each of the emission layers EL may emit light having at least one of a blue color, a red color, or a green color. However, the inventive concept is not limited thereto. For example, a single emission layer EL may be commonly provided to be connected to the pixels. In this case, the emission layer EL may provide blue light or white light. However, the inventive concept is not limited thereto.

The second electrode CE may be disposed on the emission layer EL. The second electrode CE may have an integrated shape and be disposed (e.g., commonly disposed) on the plurality of pixels. A common voltage may be provided to the second electrode CE, and the second electrode CE may be referred to as a common electrode.

In one or more embodiments, a hole control layer may be disposed between the first electrode AE and the emission layer EL. The hole control layer may be disposed (e.g., commonly disposed) on the emission area PXA and the non-emission area NPXA. The hole control layer may include a hole transport layer and may further include a hole injection layer. An electron control layer may be disposed between the emission layer EL and the second electrode CE. The electron control layer may include an electron transport layer and may further include an electron injection layer. The hole control layer and the electron control layer may be formed (e.g., commonly formed) in the plurality of pixels by using an open mask.

An encapsulation layer 140 may be disposed on the light emitting element layer 130. The encapsulation layer 140 may include an inorganic layer, an organic layer, and an inorganic layer, which are sequentially laminated, but layers constituting the encapsulation layer 140 are not limited thereto.

The inorganic layers may protect the light emitting element layer 130 against moisture and oxygen, and the organic layer may protect the light emitting element layer 130 against foreign substances (e.g., undesirable substances from an external environment) such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the embodiment of the inventive concept is not limited thereto.

The sensor layer 200 may be disposed on the display layer 100 through a continuous or substantially continuous process. In this case, the sensor layer 200 may be directly disposed on the display layer 100. The direct disposition may refer to a case in which no third component is disposed between the sensor layer 200 and the display layer 100. That is, a separate adhesive member may not be disposed between the sensor layer 200 and the display layer 100. In this case, a thickness of the electronic device 1000 may be thinner.

The sensor layer 200 may include a base insulating layer 201, a first conductive layer 202, a sensing insulating layer 203, a second conductive layer 204, and a cover insulating layer 205.

The base insulating layer 201 may be an inorganic layer including any one of silicon nitride, silicon oxynitride, and silicon oxide. Alternatively, the base insulating layer 201 may be an organic layer including an epoxy resin, an acrylic resin, or an imide-based resin. The base insulating layer 201 may have a single-layer structure or a multilayer structure in which a plurality of layers are laminated in the third direction DR3.

Each of the first conductive layer 202 and the second conductive layer 204 may have a single-layer structure or a multilayer structure in which a plurality of layers are laminated in the third direction DR3.

The conductive layer having the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), and the like. In addition, the transparent conductive layer may include conductive polymers such as PEDOT, metal nanowires, graphene, and the like.

The conductive layer having the multilayer structure may include metal layers. The metal layers may have a three-layered structure of titanium/aluminum/titanium. The conductive layer having the multilayer structure may include at least one metal layer and at least one transparent conductive layer.

At least one of the sensing insulating layer 203 or the cover insulating layer 205 may include an inorganic layer. The inorganic layer may include at least one of aluminum oxide, titanium oxide, silicon oxide, silicon oxynitride, zirconium oxide, or hafnium oxide.

A parasitic capacitance Cb may be generated between the sensor layer 200 and the second electrode CE. As the distance between the sensor layer 200 and the second electrode CE becomes closer, a value of the parasitic capacitance Cb may increase. As the parasitic capacitance Cb increases, a ratio of change in amount of capacitance to the reference value may decrease. The change in capacitance may refer to a change in capacitance that occurs before and after an input by the input unit, for example, the active pen 2000 (e.g., see FIG. 2) or the user's body 3000 (e.g., see FIG. 2).

The driving chip processing the signal sensed from the sensor layer 200 may perform a leveling operation of removing a value corresponding to the parasitic capacitance Cb from the sensed signal. By the leveling operation, the ratio of change in amount of capacitance compared to a reference value may increase, such that sensing sensitivity may be improved (e.g., the sensing sensitivity may be increased).

However, there may be a difference in ability to remove a value corresponding to the parasitic capacitance Cb according to a specification of the driving chip. For example, if a maximum parasitic capacitance Cb is about 500 picofarads, and the capacitance value that is capable be being removed from the signal sensed from the sensor layer 200 by the driving chip is about 200 picofarads, a reference value may not be sufficiently lowered by the driving chip. In this case, a ratio of the amount of change in capacitance compared to the reference value is insignificant, and thus, a malfunction in which the driving chip does not recognize the amount of change in capacitance as noise or does not recognize the touch coordinates may occur. In other words, the sensing sensitivity may not be at a sufficient level to reliably distinguish the application and/or coordinates of, for example, a user's touch or an active pen. According to the inventive concept, the electrode structure of the sensor layer 200 may be modified to provide the maximum value of the parasitic capacitance Cb as a set value (e.g., predetermined value) or less. In other words, the electrode structure of the sensor layer 200 may be modified, such that the parasitic capacitance Cb may not exceed a set value (e.g., predetermined value). In this case, even when performance of the driving chip is relatively low, accuracy of the coordinate recognition may be improved. The set value (e.g., predetermined value) may be about 200 picofarads, but is not particularly limited thereto.

Figure 4:
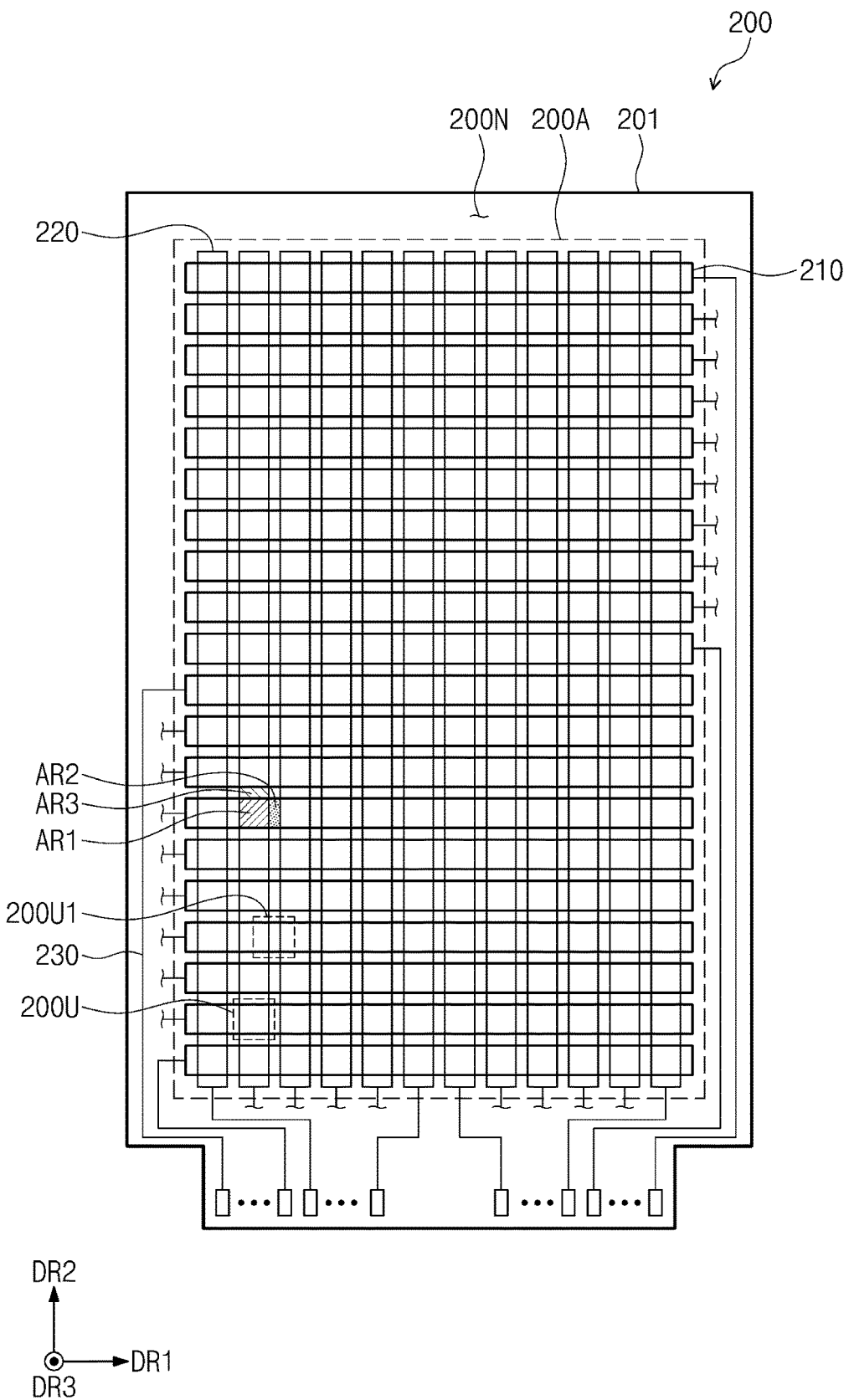
FIG. 4 is a plan view of a sensor layer according to an embodiment of the inventive concept.

FIG. 4 is a plan view of the sensor layer according to an embodiment of the inventive concept.

Referring to FIG. 4, the sensor layer 200 may include a sensing area 200A and a peripheral area 200N. The sensing area 200A may be an area that is activated according to an electrical signal. For example, the sensing area 200A may be an area that senses an input. The peripheral area 200N may surround the sensing area 200A.

The sensor layer 200 may include a base insulating layer 201, a plurality of electrodes 210, a plurality of cross electrodes 220, and a plurality of sensing lines 230. The plurality of electrodes 210 and the plurality of cross electrodes 220 may be disposed on the sensing area 200A. The plurality of sensing lines 230 may be disposed on the peripheral area 200N.

The sensor layer 200 may operate in a first mode in which information on an external input is acquired through a change in mutual capacitance between the plurality of electrodes 210 and the plurality of cross electrodes 220 or a second mode in which an impact by the active pen 2000 (e.g., see FIG. 2) is sensed through a change in capacitance of each of the plurality of electrodes 210 and the plurality of cross electrodes 220.

The driving chip processing the signal sensed from the sensor layer 200 may sense the change in mutual capacitance between the plurality of electrodes 210 and the plurality of cross electrodes 220 when the user's touch is applied in the first mode.

Each of the plurality of electrodes 210 may extend in the first direction DR1. The plurality of electrodes 210 may be arranged to be spaced from each other in the second direction DR2. Each of the plurality of cross electrodes 220 may extend in the second direction DR2. The plurality of cross electrodes 220 may be arranged to be spaced from each other in the first direction DR1. In one or more embodiments, the plurality of electrodes 210 and the plurality of cross electrodes 220 may cross each other on a plane or in a plan view.

The sensor layer 200 includes a first region AR1 in which the plurality of electrodes 210 and the plurality of cross electrodes 220 are crossing to be insulated from each other, a second region AR2 adjacent to the first region AR1 in the first direction DR1, and a third region AR3 adjacent to the first region AR1 in the second direction DR2. The plurality of electrodes 210 may overlap each other in the second region AR2, and the plurality of cross electrodes 220 may not overlap each other in the second region AR2. The plurality of cross electrodes 220 may overlap each other in the third region AR3, and the plurality of electrodes 210 may not overlap each other in the third region AR3.

Figure 5A:
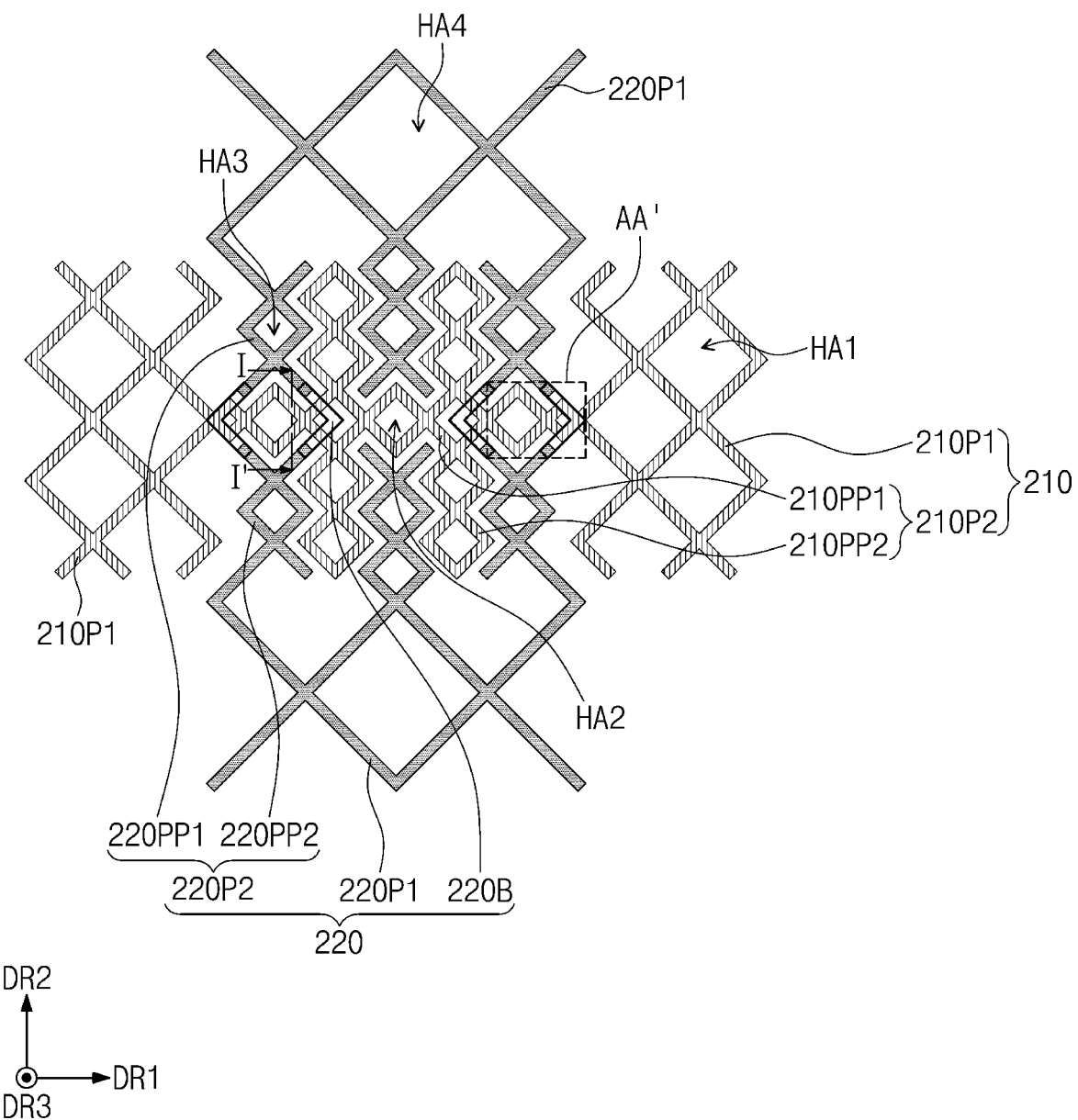
FIG. 5A is an enlarged plan view of an area 200U of FIG. 4 according to an embodiment of the inventive concept.
Figure 5B:
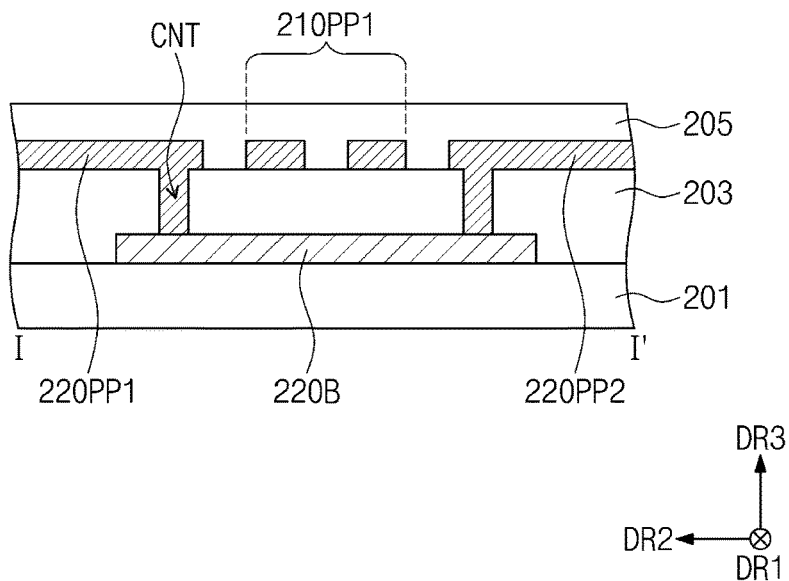
FIG. 5B is a cross-sectional view taken along line I-I' of FIG. 5A according to an embodiment of the inventive concept.
Figure 5C:
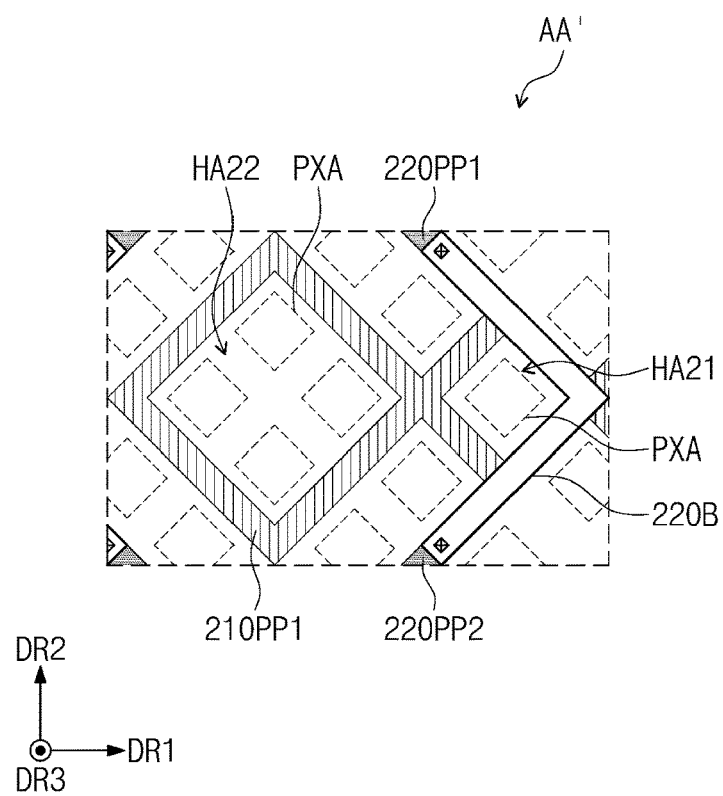
FIG. 5C is an enlarged plan view of an area AA' of FIG. 5A according to an embodiment of the inventive concept.

FIG. 5A is an enlarged plan view of an area 200U of FIG. 4 according to an embodiment of the inventive concept, FIG. 5B is a cross-sectional view taken along line I-I' of FIG. 5A according to an embodiment of the inventive concept, and FIG. 5C is an enlarged plan view of an area AA' of FIG. 5A according to an embodiment of the inventive concept.

Referring to FIGS. 5A-5C, each of the plurality of electrodes 210 may include a plurality of first portions 210P1 and a second portion 210P2.

The plurality of first portions 210P1 may be spaced from each other in the first direction DR1. The plurality of first portions 210P1 may be disposed on the second region AR2 (e.g., see FIG. 4).

The second portion 210P2 may be disposed between the plurality of first portions 210P1. The second portion 210P2 may be disposed in the first region AR1 (e.g., see FIG. 4).

The plurality of first portions 210P1 and the plurality of second portion 210P2 may have a mesh structure. The plurality of first portions 210P1 and the second portion 210P2 may be provided integrally.

The second portion 210P2 may include a first pattern portion 210PP1 and a plurality of second pattern portions 210PP2. The first pattern portion 210PP1 may extend in the first direction DR1. The plurality of second pattern portions 210PP2 may extend in the second direction DR2 from the first pattern portion 210PP1.

A first opening HA1 may be defined in each of the plurality of first portions 210P1. A second opening HA2 may be defined in the first pattern portion 210PP1. A size of the first opening HA1 may be greater than that of the second opening HA2. For example, the size of the first opening HA1 may be greater than the size of the second opening HA2 in a plan view or on a plane.

Each of the plurality of cross electrodes 220 may include a plurality of first cross portions 220P1, a second cross portion 220P2, and a bridge pattern 220B.

The plurality of first cross portions 220P1 may be spaced from each other in the second direction DR2. The plurality of first cross portions 220P1 may be disposed in the third region AR3 (e.g., see FIG. 4). The plurality of first cross portions 220P1 may be referred to as third portions of the plurality of cross electrodes 220.

The second cross portion 220P2 may be disposed between the plurality of first cross portions 220P1. In one or more embodiments, the second cross portion 220P2 may be disposed between the plurality of first cross portions 220P1 in the second direction DR2. When viewed on a plane or in a plan view, the second cross portion 220P2 may not overlap the second opening HA2.

The plurality of first cross portions 220P1 and the second cross portion 220P2 may have a mesh structure.

The second cross portion 220P2 may include a plurality of first cross pattern portions 220PP1 and a plurality of second cross pattern portions 220PP2. The plurality of first cross pattern portions 220PP1 may be adjacent to one side of one of the plurality of first cross portions 220P1 and may extend in the second direction DR2. The plurality of second cross pattern portions 220PP2 may be adjacent to another side of another one of the plurality of first cross portions 220P1 and may extend in the second direction DR2.

The plurality of first cross pattern portions 220PP1 and the plurality of second pattern portions 210PP2 may be alternately arranged in the first direction DR1. The plurality of first cross pattern portions 220PP1 may be spaced from each other in the first direction DR1 with the plurality of second cross pattern portions 220PP2 therebetween.

The plurality of second cross pattern portions 220PP2 and the plurality of second pattern portions 210PP2 may be alternately arranged in the first direction DR1. The plurality of second cross pattern portions 220PP2 may be spaced from each other in the first direction DR1 with the plurality of second pattern portions 210PP2 therebetween.

The second portion 210P2 and the second cross portion 220P2 may be disposed adjacent to each other on the first region AR1 (e.g., see FIG. 4), such that a length of a boundary between the second portion 210P2 and the second cross portion 220P2, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 (e.g., see FIG. 4) may be improved.

A third opening HA3 may be defined in the second cross portion 220P2. When viewed on the plane or in the plan view, the second portion 210P2 may not overlap the third opening HA3. A fourth opening HA4 may be defined in each of the plurality of first cross portions 220P1. The fourth opening HA4 may have a size greater than that of the third opening HA3. For example, the size of the fourth opening HA4 may be greater than the size of the third opening HA3 in a plan view or on a plane.

Each of the first opening HA1 defined in the second region AR2 (e.g., see FIG. 4) and the fourth opening HA4 defined in the third region AR3 (e.g., see FIG. 4) of the sensor layer 200 (e.g., see FIG. 4) may have a size larger than that of each of the second opening HA2 and the third opening HA3. When viewed on the plane or in the plan view, an area on which the plurality of first portions 210P1 and the plurality of first cross portions 220P1 overlap the second electrode CE (e.g., see FIG. 3) may be reduced. Thus, the value of the parasitic capacitance Cb (e.g., see FIG. 3) may be reduced. According to the inventive concept, the sensor layer 200 (e.g., see FIG. 4) may provide the maximum value of the parasitic capacitance Cb (e.g., see FIG. 3) as the set value (e.g., predetermined value) or less. The ratio of the amount of change in capacitance to the reference value may increase. Thus, the sensing sensitivity of the sensor layer 200 (e.g., see FIG. 4) with respect to the amount of change in capacitance may be improved.

The bridge pattern 220B may be disposed on a layer different from the layer on which the plurality of first portions 210P1, the plurality of second portions 210P2, the plurality of first cross portions 220P1, and the plurality of second cross portions 220P2 are disposed. For example, the bridge pattern 220B may be at a different layer than the plurality of first portions 210P1, the plurality of second portions 210P2, the plurality of first cross portions 220P1, and the plurality of second cross portions 220P2. The bridge pattern 220B may be crossing to be insulated from the plurality of first portions 210P1, the plurality of the second portions 210P2, the plurality of first cross portions 220P1, and the plurality of second cross portions 220P2.

The bridge pattern 220B may be disposed on the base insulating layer 201. The sensing insulating layer 203 may be disposed on the bridge pattern 220B. The sensing insulating layer 203 may cover the bridge pattern 220B. The sensing insulating layer 203 may include an inorganic material, an organic material, or a composite material.

The plurality of first cross pattern portions 220PP1, the plurality of second cross pattern portions 220PP2, and the first pattern portion 210PP1 may be disposed on the sensing insulating layer 203.

A plurality of contact holes CNT may be defined by passing through the sensing insulating layer 203 in the third direction DR3. The plurality of first cross pattern portions 220PP1 and the plurality of second cross pattern portions 220PP2 may be connected (e.g., electrically connected) to the bridge pattern 220B through the plurality of contact holes CNT.

The cover insulating layer 205 may be disposed on the plurality of first cross pattern portions 220PP1, the plurality of second cross pattern portions 220PP2, and the first pattern portion 210PP1. The cover insulating layer 205 may cover the plurality of first cross pattern portions 220PP1, the plurality of second cross pattern portions 220PP2, and the first pattern portion 210PP1. The cover insulating layer 205 may include an inorganic material, an organic material, or a composite material.

In FIG. 5B, for example, the bridge pattern 220B may have a bottom bridge structure in which the bridge pattern 220B is disposed under the plurality of first cross pattern portions 220PP1, the plurality of second cross pattern portions 220PP2, and the first pattern portion 210PP1, but the structure of the sensor layer 200 (e.g., see FIG. 4) according to an embodiment of the inventive concept is not limited thereto. For example, the sensor layer 200 (e.g., see FIG. 4) according to an embodiment of the inventive concept may have a top bridge structure in which the bridge pattern 220B is disposed on the plurality of first cross pattern portions 220PP1, the plurality of second cross pattern portions 220PP2, and the first pattern portion 210PP1.

When viewed on the plane or in the plan view, the bridge pattern 220B may overlap the first pattern portion 210PP1.

The bridge pattern 220B may be provided in plurality on the first region AR1 (e.g., see FIG. 4) of the sensor layer 200 (e.g., see FIG. 4). The number of the plurality of bridge patterns 220B may be about 50 or less. When the number of the plurality of bridge patterns 220B is about 50 or more, the plurality of bridge patterns 220B may be visually recognized from the outside. However, according to the inventive concept, the number of the plurality of bridge patterns 220B may be about 50 or less to prevent or substantially prevent the plurality of bridge patterns 220B from being visually recognized from the outside. In one or more embodiments, the number of the plurality of bridge patterns 220B may be about four. However, the inventive concept is not limited thereto.

Also, the number of the plurality of bridge patterns 220B may be about 50 or less to reduce the number of contact holes CNT. Thus, a process loss that may occur when the contact hole CNT for providing the plurality of bridge patterns 220B is defined may be reduced.

The second opening HA2 may be provided in plurality. The plurality of second openings HA21 and HA22 may have different sizes from each other. For example, the size of one second opening HA21 may be less than that of the other second opening HA22. In one or more embodiments, the size of one second opening HA21 may be less than the size of the other second opening HA22 on a plane or in a plan view.

The plurality of light emitting areas PXA defined on the display layer 100 (e.g., see FIG. 3) may not overlap the plurality of first cross pattern portions 220PP1, the plurality of second cross pattern portions 220PP2, and the first pattern portions 210PP1, and the bridge pattern 220B. Some of the plurality of light emitting areas PXA may overlap the plurality of second openings HA21 and HA22.

One light-emitting area PXA may overlap the second opening HA21.

However, this is merely an example. The number of light emitting areas PXA overlapping the second opening HA21 according to an embodiment of the inventive concept is not limited thereto. For example, four light-emitting areas PXA may overlap the second opening HA21. In other words, four light-emitting areas PXA may overlap a single second opening HA21.

At least four or more light-emitting areas PXA may overlap the second opening HA22. For example, FIG. 5C illustrates a structure the four light emitting areas PXA overlap the second opening HA22. However, this is merely an example. The number of light emitting areas PXA overlapping the second opening HA22 according to an embodiment of the inventive concept is not limited thereto. For example, nine light-emitting areas PXA may overlap the second opening HA22. In one or more embodiments, less than four light-emitting areas PXA may overlap the second opening HA22.

Figure 6:
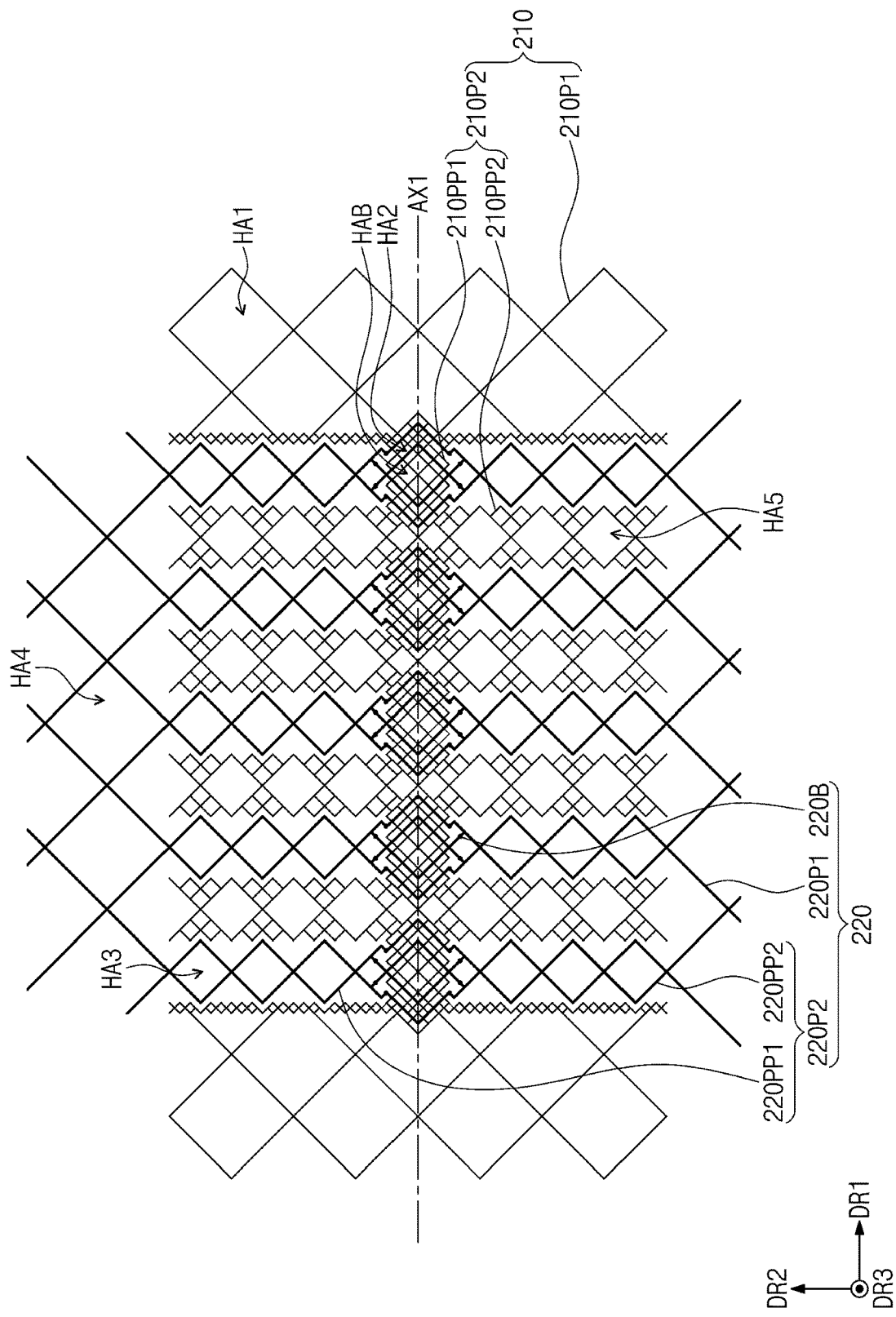
FIG. 6 is a plan view of the area 200U of FIG. 4 according to an embodiment of the inventive concept.

FIG. 6 is a plan view of the area 200U of FIG. 4 according to an embodiment of the inventive concept.

Referring to FIGS. 4 and 6, the plurality of first cross pattern portions 220PP1 and the plurality of second cross pattern portions 220PP2 may have shapes that are symmetrical with respect to an axis AX1 extending in the first direction DR1.

One first cross pattern portion 220PP1 and one second cross pattern portion 220PP2 may be connected (e.g., electrically connected) to each other through the plurality of bridge patterns 220B. For example, one first cross pattern portion 220PP1 and one second cross pattern portion 220PP2 may be connected (e.g., electrically connected) to each other through four bridge patterns 220B. In one or more embodiments, twenty bridge patterns 220B may be disposed on the first region AR1.

When viewed on the plane or in the plan view, the bridge pattern 220B may overlap the first pattern portion 210PP1. The bridge pattern 220B may have a mesh structure. An opening HAB may be defined in the bridge pattern 220B. The first pattern portion 210PP1 may overlap the opening HAB. The opening HAB may have a size greater than that of the second opening HA2. For example, the size of the opening HAB may be greater than the size of the second opening HA2 in a plan view or on a plane.

A fifth opening HA5 may be defined in each of the plurality of second pattern portions 210PP2. The fifth opening HA5 may have a size less than that of each of the first opening HA1 and the fourth opening HA4. For example, the size of the fifth opening HA5 may be less than the size of each of the first opening HA1 and the fourth opening HA4 in a plan view or on a plane.

In the first region AR1, the second portion 210P2 and the second cross portion 220P2 may be disposed adjacent to each other, such that a length of a boundary between the second portion 210P2 and the second cross portion 220P2, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

Each of the first opening HA1 defined in the second region AR2 and the fourth opening HA4 defined in the third region AR3 of the sensor layer 200 may have a size greater than that of each of the second opening HA2, the third opening HA3, and the fifth opening HA5. For example, the first opening HA1 may be greater in size than each of the second opening HA2, the third opening HA3, and the fifth opening HA5 individually on a plane or in a plan view, and the fourth opening HA4 may be greater in size than each of the second opening HA2, the third opening HA3, and the fifth opening HA5 individually on a plane or in a plan view. When viewed on the plane or in the plan view, an area on which the plurality of first portions 210P1 and the plurality of first cross portions 220P1 overlap the second electrode CE (e.g., see FIG. 3) may be reduced. According to the inventive concept, the value of the parasitic capacitance Cb (e.g., see FIG. 3) may be reduced. Thus, the sensing sensitivity for the amount of change in capacitance of the sensor layer 200 may be improved.

Figure 7A:
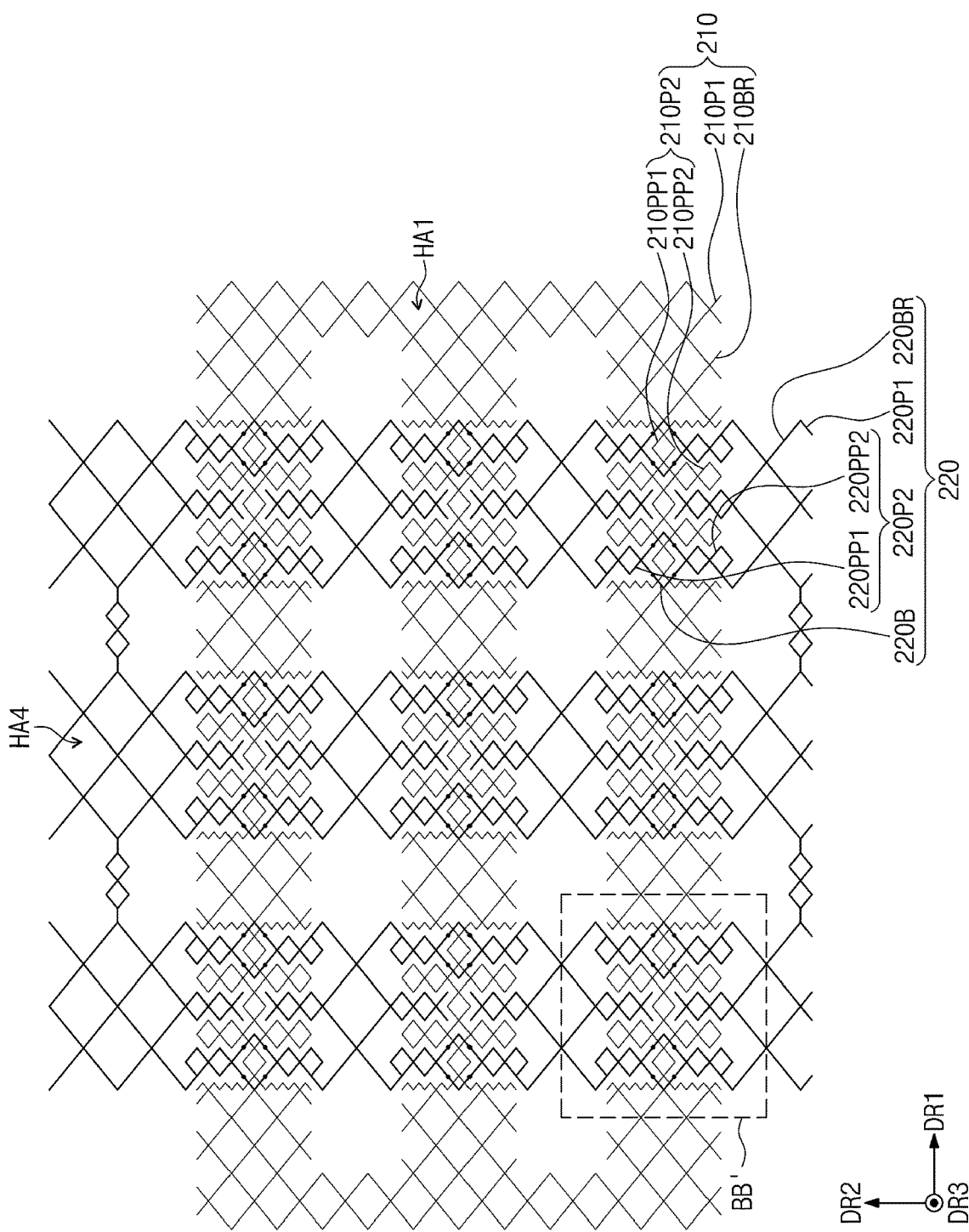
FIG. 7A is a plan view of an area 200U of FIG. 4 according to an embodiment of the inventive concept.
Figure 7B:
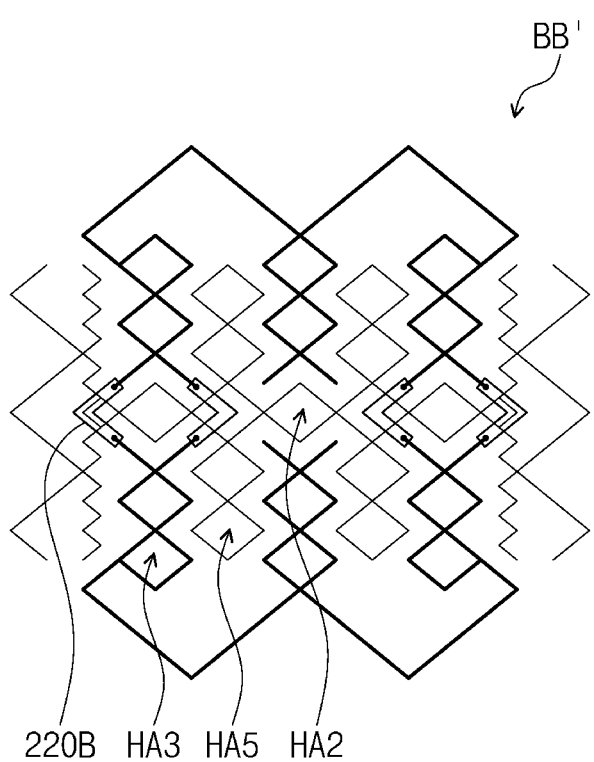
FIG. 7B is an enlarged plan view of an area BB' of FIG. 7A according to an embodiment of the inventive concept.

FIG. 7A is a plan view of an area 200U of FIG. 4 according to an embodiment of the inventive concept, and FIG. 7B is an enlarged plan view of an area BB' of FIG. 7A according to an embodiment of the inventive concept.

Referring to FIGS. 4, 7A, and 7B, each of the plurality of electrodes 210 may include a plurality of first portions 210P1, a plurality of second portions 210P2, and a plurality of branch portions 210BR.

Each of the plurality of first portions 210P1 may be branched into a plurality of branch portions 210BR. For example, one first portion 210P1 may be branched into three branch portions as shown in FIG. 7A. However, the inventive concept is not limited thereto. In one or more embodiments, a gap may be defined between the plurality of branch portions 210BR. The plurality of branch portions 210BR may be arranged to be spaced from each other in the second direction DR2.

The plurality of branch portions 210BR may extend to the plurality of second portions 210P2, respectively.

Each of the plurality of cross electrodes 220 may include a plurality of first cross portions 220P1, a plurality of second cross portions 220P2, a plurality of cross branch portions 220BR, and a plurality of bridge patterns 220B.

Each of the plurality of first cross portions 220P1 may be branched into the plurality of cross branch portions 220BR. For example, one first cross portion 220P1 may be branched into three cross branch portions as shown in FIG. 7A. However, the inventive concept is not limited thereto. In one or more embodiments, a gap may be defined between the plurality of cross branch portions 220BR. The plurality of cross branch portions 220BR may be arranged to be spaced from each other in the first direction DR1.

Each of the plurality of cross branch portions 220BR may be branched into the plurality of second cross portions 220P2. For example, one cross branch portion 220BR may be branched into three second cross portions 220P2 as shown in FIG. 7A. However, the inventive concept is not limited thereto. In one or more embodiments, the plurality of second pattern portions 210PP2 may be disposed between the plurality of second cross portions 220P2, respectively.

The plurality of second portions 210P2 and the plurality of second cross portions 220P2 may be disposed on a crossing area on which the plurality of electrodes 210 and the plurality of cross electrodes 220 are crossing with each other. A plurality of crossing areas on which the plurality of electrodes 210 and the plurality of cross electrodes 220 are crossing with each other may be provided. For example, nine crossing areas may be provided as shown in FIG. 7A. However, the inventive concept is not limited thereto.

The plurality of first cross pattern portions 220PP1 and the plurality of second cross pattern portions 220PP2 may be connected (e.g., electrically connected) to each other through the plurality of bridge patterns 220B. For example, the plurality of first cross pattern portions 220PP1 and the plurality of second cross pattern portions 220PP2 may be connected (e.g., electrically connected) to each other through four bridge patterns 220B as shown in FIG. 7B. In one or more embodiments, thirty six bridge patterns 220B may be disposed in the first region AR1 as shown in FIG. 7A. However, the inventive concept is not limited thereto.

In the first region AR1, the second portion 210P2 and the second cross portion 220P2 may be alternately arranged with each other. The second portion 210P2 and the second cross portion 220P2 may be disposed adjacent to each other, such that a length of a boundary between the second portion 210P2 and the second cross portion 220P2, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

Each of the first opening HA1 defined in the second region AR2 and the fourth opening HA4 defined in the third region AR3 of the sensor layer 200 may have a size greater than that of each of the second opening HA2, the third opening HA3, and the fifth opening HA5. For example, the first opening HA1 may be greater in size than each of the second opening HA2, the third opening HA3, and the fifth opening HA5 individually on a plane or in a plan view, and the fourth opening HA4 may be greater in size than each of the second opening HA2, the third opening HA3, and the fifth opening HA5 individually on a plane or in a plan view. When viewed on the plane or in the plan view, an area on which the plurality of first portions 210P1 and the plurality of first cross portions 220P1 overlap the second electrode CE (e.g., see FIG. 3) may be reduced. According to the inventive concept, the value of the parasitic capacitance Cb (e.g., see FIG. 3) may be reduced. Thus, the sensing sensitivity of the sensor layer 200 for the amount of change in capacitance may be improved.

Figure 7C:
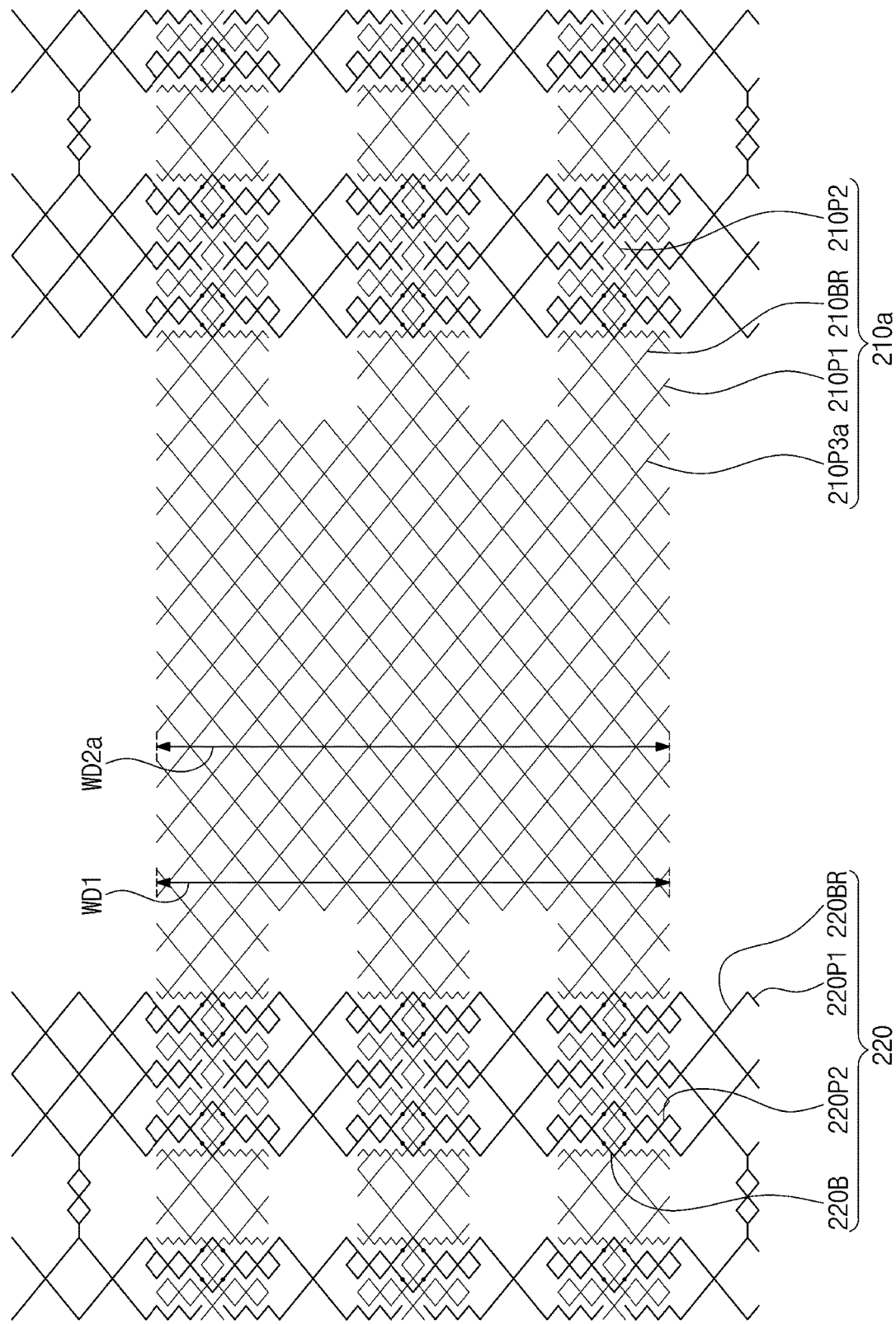
FIG. 7C is a plan view of an area 200U1 of FIG. 4 according to an embodiment of the inventive concept.

FIG. 7C is a plan view of an area 200U1 of FIG. 4 according to an embodiment of the inventive concept. In description of FIG. 7C, the same reference numerals are used for the components described in FIG. 7A, and descriptions thereof may not be repeated.

Referring to FIGS. 4 and 7C, an electrode 210a may further include a third portion 210P3a spaced from the second portion 210P2 with the first portion 210P1 therebetween. The third portion 210P3a may be disposed between the plurality of first portions 210P1. The third portion 210P3a may be disposed on the second region AR2. A width WD2a of the third portion 210P3a may be the same as (equal to) or substantially the same as (substantially equal to) a width WD1 of the first portion 210P1.

FIG. 7D is a plan view of the area 200U1 of FIG. 4 according to an embodiment of the inventive concept. In the description of FIG. 7D, the same reference numerals are used for the components described through FIG. 7A, and descriptions thereof may not be repeated.

Referring to FIGS. 4 and 7D, an electrode 210b may further include a third portion 210P3b spaced from the second portion 210P2 with the first portion 210P1 therebetween. The third portion 210P3b may be disposed between the plurality of first portions 210P1. The third portion 210P3b may be disposed on the second region AR2. A width WD2b of the third portion 210P3b may be less than a width WD1 of the first portion 210P1. For example, the width WD2b of the third portion 210P3b may be the same as (equal to) or substantially the same as (substantially equal to) a width WD3 of each of the plurality of branch portions 210BR.

Each of FIGS. 7B and 7D exemplarily illustrates the pattern of FIG. 7A, but the shape of the pattern of each of the electrode 210 and the cross electrode 220 according to an embodiment of the inventive concept is not limited thereto and thus may have a shape of each of patterns according to other embodiments of the inventive concept.

Figure 8A:
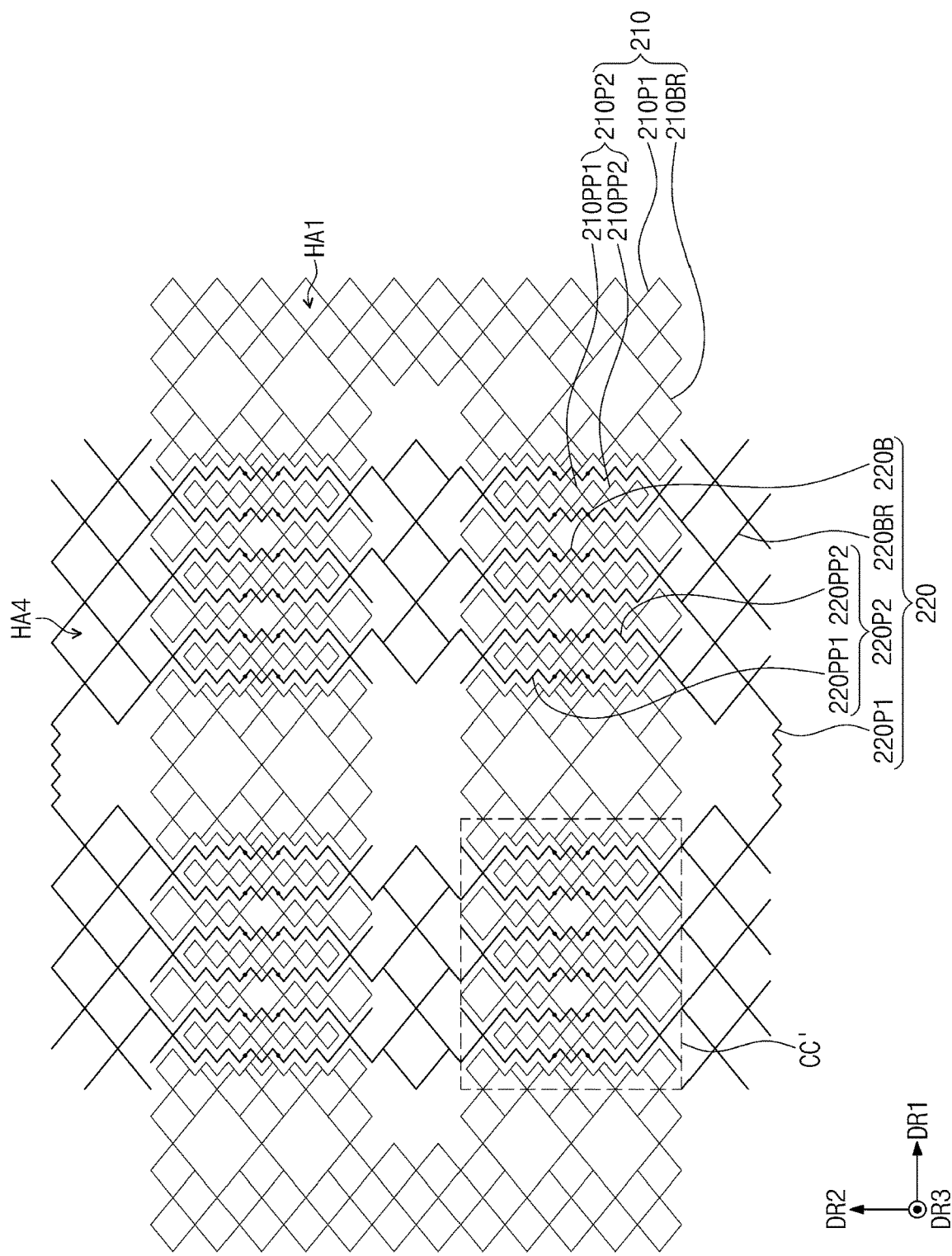
FIG. 8A is a plan view of the area 200U of FIG. 4 according to an embodiment of the inventive concept.
Figure 8B:
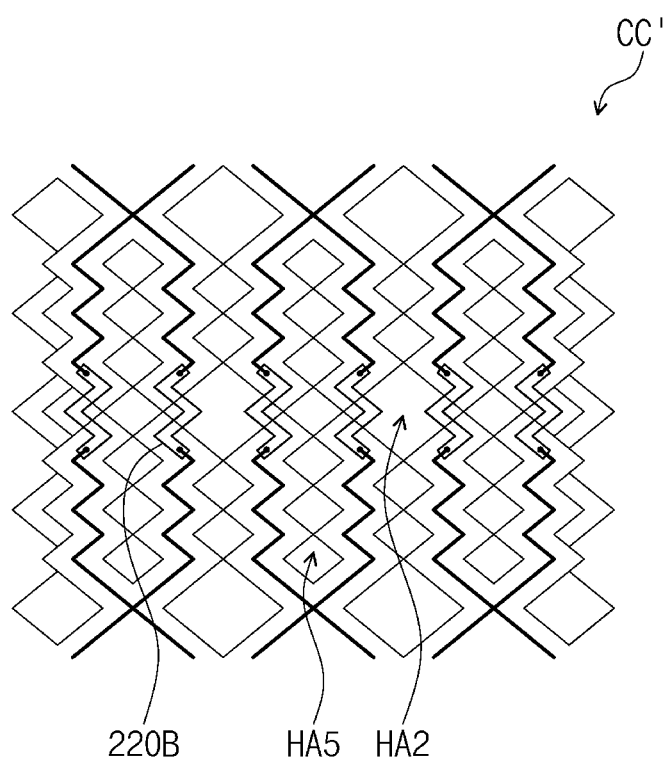
FIG. 8B is an enlarged plan view of an area CC' of FIG. 8A according to an embodiment of the inventive concept.

FIG. 8A is a plan view of the area 200U of FIG. 4 according to an embodiment of the inventive concept, and FIG. 8B is an enlarged plan view of an area CC' of FIG. 8A according to an embodiment of the inventive concept.

Referring to FIGS. 4, 8A, and 8B, each of the plurality of electrodes 210 may include a plurality of first portions 210P1, a plurality of second portions 210P2, and a plurality of branch portions 210BR.

Each of the plurality of first portions 210P1 may be branched into the plurality of branch portions 210BR. For example, one first portion 210P1 may be branched into two branch portions as shown in FIG. 8A. However, the inventive concept is not limited thereto. In one or more embodiments, a gap may be defined between the plurality of branch portions 210BR. The plurality of branch portions 210BR may be arranged to be spaced from each other in the second direction DR2.

The plurality of branch portions 210BR may extend to the plurality of second portions 210P2, respectively.

Each of the plurality of cross electrodes 220 may include a plurality of first cross portions 220P1, a plurality of second cross portions 220P2, a plurality of cross branch portions 220BR, and a plurality of bridge patterns 220B.

Each of the plurality of first cross portions 220P1 may be branched into the plurality of cross branch portions 220BR. For example, one first cross portion 220P1 may be branched into two cross branch portions as shown in FIG. 8A. However, the inventive concept is not limited thereto. In one or more embodiments, a gap may be defined between the plurality of cross branch portions 220BR. The plurality of cross branch portions 220BR may be arranged to be spaced from each other in the first direction DR1.

Each of the plurality of cross branch portions 220BR may be branched into the plurality of second cross portions 220P2. For example, one cross branch portion 220BR may be branched into six second cross portions 220P2 as shown in FIG. 8A. However, the inventive concept is not limited thereto. In one or more embodiments, the plurality of second cross pattern portions 220PP2 may be disposed between the plurality of second cross portions 220P2, respectively.

The plurality of second portions 210P2 and the plurality of second cross portions 220P2 may be disposed on a crossing area on which the plurality of electrodes 210 and the plurality of cross electrodes 220 are crossing with each other. A plurality of crossing areas on which the plurality of electrodes 210 and the plurality of cross electrodes 220 are crossing with each other may be provided. For example, four crossing areas may be provided as shown in FIG. 8A. However, the inventive concept is not limited thereto.

The plurality of second cross portions 220P2 may be interdigitated with the plurality of second pattern portions 210PP2. For example, the plurality of second cross portions 220P2 may have a zigzag shape. In the first region AR1, the second portion 210P2 and the second cross portion 220P2 may be disposed adjacent to each other, such that a length of a boundary between the second portion 210P2 and the second cross portion 220P2, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

The plurality of first cross pattern portions 220PP1 and the plurality of second cross pattern portions 220PP2 may be connected (e.g., electrically connected) to each other through the plurality of bridge patterns 220B. For example, the plurality of first cross pattern portions 220PP1 and the plurality of second cross pattern portions 220PP2 may be connected (e.g., electrically connected) to each other through four bridge patterns 220B. The bridge patterns 220B may have a zigzag shape. 16 bridge patterns 220B may be disposed in the first region AR1.

Each of the first opening HA1 defined in the second region AR2 and the fourth opening HA4 defined in the third region AR3 of the sensor layer 200 may have a size greater than that of each of the second opening HA2 and the fifth opening HA5. For example, the first opening HA1 may be greater in size than each of the second opening HA2, the third opening HA3, and the fifth opening HA5 individually on a plane or in a plan view, and the fourth opening HA4 may be greater in size than each of the second opening HA2, the third opening HA3, and the fifth opening HA5 individually on a plane or in a plan view. When viewed on the plane or in the plan view, an area on which the plurality of first portions 210P1 and the plurality of first cross portions 220P1 overlap the second electrode CE (e.g., see FIG. 3) may be reduced. According to the inventive concept, the value of the parasitic capacitance Cb (e.g., see FIG. 3) may be reduced. Thus, the sensing sensitivity of the sensor layer 200 for the amount of change in capacitance may be improved.

Figure 9A:
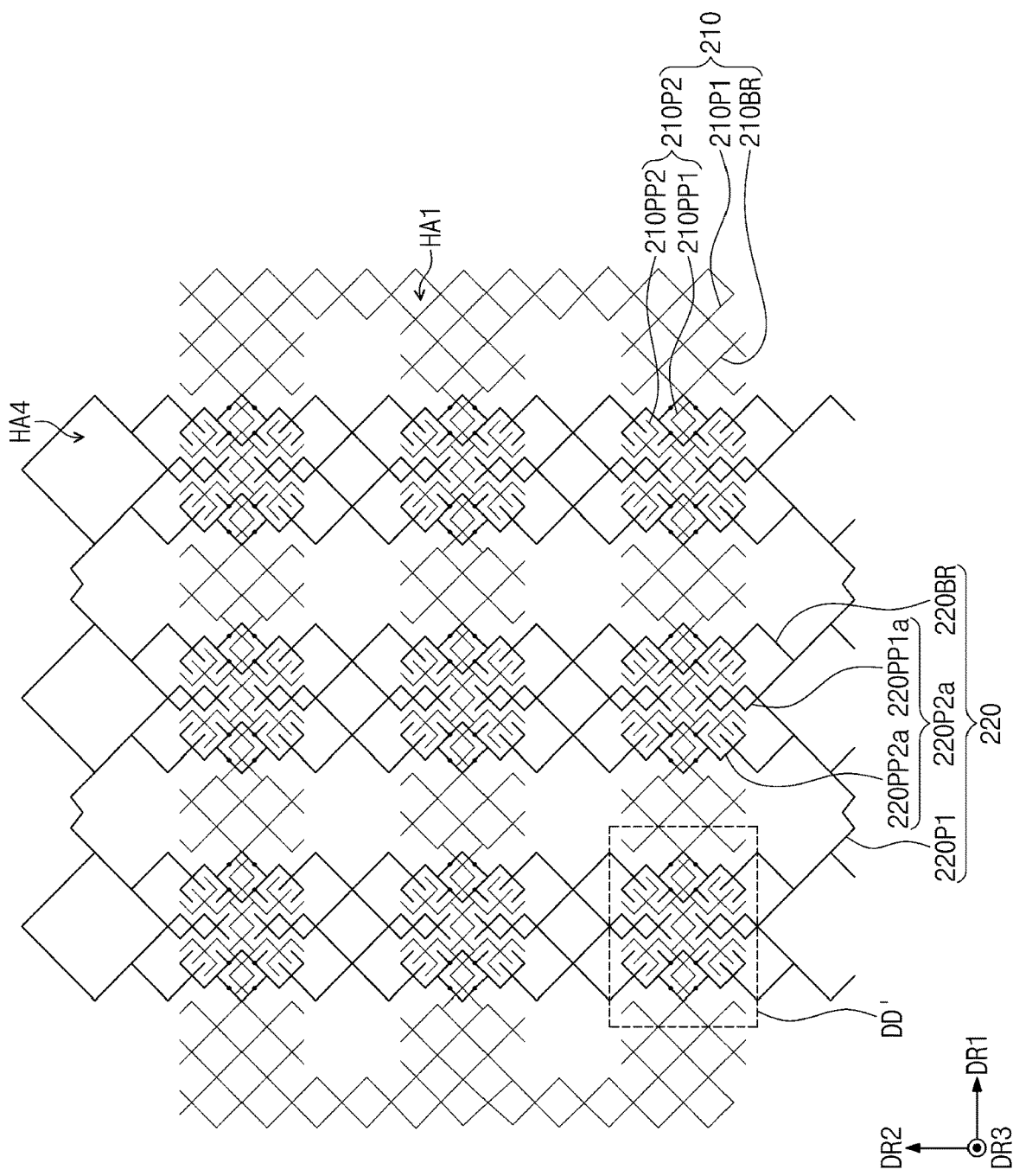
FIG. 9A is a plan view of the area 200U of FIG. 4 according to an embodiment of the inventive concept.
Figure 9B:
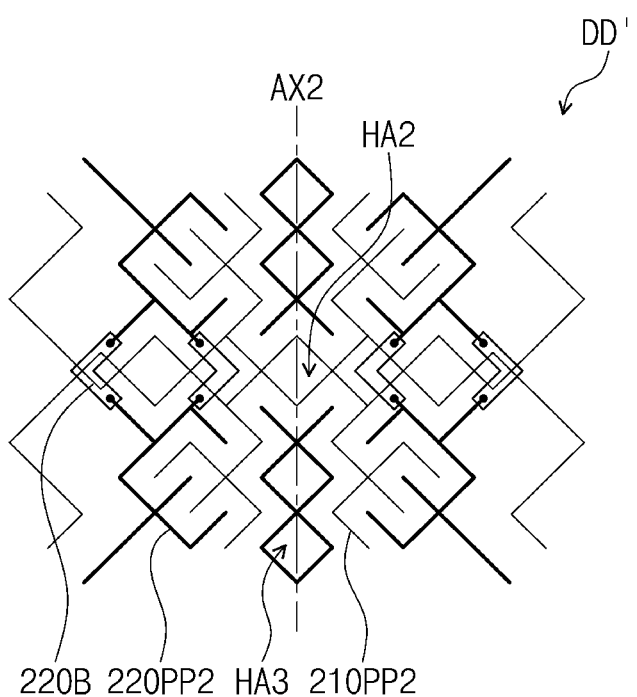
FIG. 9B is an enlarged plan view of an area DD' of FIG. 9A according to an embodiment of the inventive concept.

FIG. 9A is a plan view of the area 200U of FIG. 4 according to an embodiment of the inventive concept, and FIG. 9B is an enlarged plan view of an area DD' of FIG. 9A according to an embodiment of the inventive concept.

Referring to FIGS. 4, 9A, and 9B, each of the plurality of electrodes 210 may include a plurality of first portions 210P1, a plurality of second portions 210P2, and a plurality of branch portions 210BR.

Each of the plurality of first portions 210P1 may be branched into the plurality of branch portions 210BR. For example, one first portion 210P1 may be branched into three branch portions. A gap may be defined between the plurality of branch portions 210BR. The plurality of branch portions 210BR may be arranged to be spaced from each other in the second direction DR2.

The plurality of branch portions 210BR may extend to the plurality of second portions 210P2, respectively.

Each of the plurality of cross electrodes 220 may include a plurality of first cross portions 220P1, a plurality of second cross portions 220P2, a plurality of cross branch portions 220BR, and a plurality of bridge patterns 220B.

The plurality of second cross portions 220P2a may include a plurality of first cross pattern portions 220PP1a and a plurality of second cross pattern portions 220PP2a. The plurality of first cross pattern portions 220PP1a and the plurality of second cross pattern portions 220PP2a may be spaced from each other with the plurality of second pattern portions 210PP2 therebetween.

Each of the plurality of first cross pattern portions 220PP1a and each of the plurality of second cross pattern portions 220PP2a may have shapes different from each other. A third opening HA3 may be defined in each of the plurality of first cross pattern portions 220PP1a.

Each of the plurality of first cross portions 220P1 may be branched into the plurality of cross branch portions 220BR. For example, one first cross portion 220P1 may be branched into three cross branch portions. A gap may be defined between the plurality of cross branch portions 220BR. The plurality of cross branch portions 220BR may be arranged to be spaced from each other in the first direction DR1.

Each of the plurality of cross branch portions 220BR may be branched into the plurality of second cross portions 220P2. For example, one cross branch portion 220BR may be branched into two second cross pattern portions 220PP2a and one first cross pattern portion 220PP1a. The plurality of second pattern portions 210PP2 may be disposed between the plurality of second cross portions 220P2, respectively.

The plurality of second portions 210P2 and the plurality of second cross portions 220P2 may be disposed on a crossing area on which the plurality of electrodes 210 and the plurality of cross electrodes 220 are interdigitated with each other. A plurality of crossing areas on which the plurality of electrodes 210 and the plurality of cross electrodes 220 are crossing with each other may be provided. For example, nine crossing areas may be provided.

The plurality of second pattern portions 210PP2 and the plurality of second cross pattern portions 220PP2 may have shapes that are symmetrical with respect to the axis AX2 extending in the second direction DR2. The plurality of second pattern portions 210PP2 and the plurality of second cross pattern portions 220PP2 may be crossing with each other. In the first region AR1, the second portion 210P2 and the second cross portion 220P2 may be disposed adjacent to each other, such that a length of a boundary between the second portion 210P2 and the second cross portion 220P2, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

The plurality of second cross pattern portions 220PP2 may be connected (e.g., electrically connected) to each other through the plurality of bridge patterns 220B. For example, the plurality of second cross pattern portions 220PP2 may be connected (e.g., electrically connected) to each other through four bridge patterns 220B. 36 bridge patterns 220B may be disposed in the first region AR1.

Each of the first opening HA1 defined in the second region AR2 and the fourth opening HA4 defined in the third region AR3 of the sensor layer 200 may have a size greater than that of each of the second opening HA2 and the third opening HA3. For example, the first opening HA1 may be greater in size than each of the second opening HA2, the third opening HA3, and the fifth opening HA5 individually on a plane or in a plan view, and the fourth opening HA4 may be greater in size than each of the second opening HA2, the third opening HA3, and the fifth opening HA5 individually on a plane or in a plan view. When viewed on the plane or in the plan view, an area on which the plurality of first portions 210P1 and the plurality of first cross portions 220P1 overlap the second electrode CE (e.g., see FIG. 3) may be reduced. According to the inventive concept, the value of the parasitic capacitance Cb (e.g., see FIG. 3) may be reduced.

Thus, the sensing sensitivity of the sensor layer 200 for the amount of change in capacitance may be improved.

Figure 10:
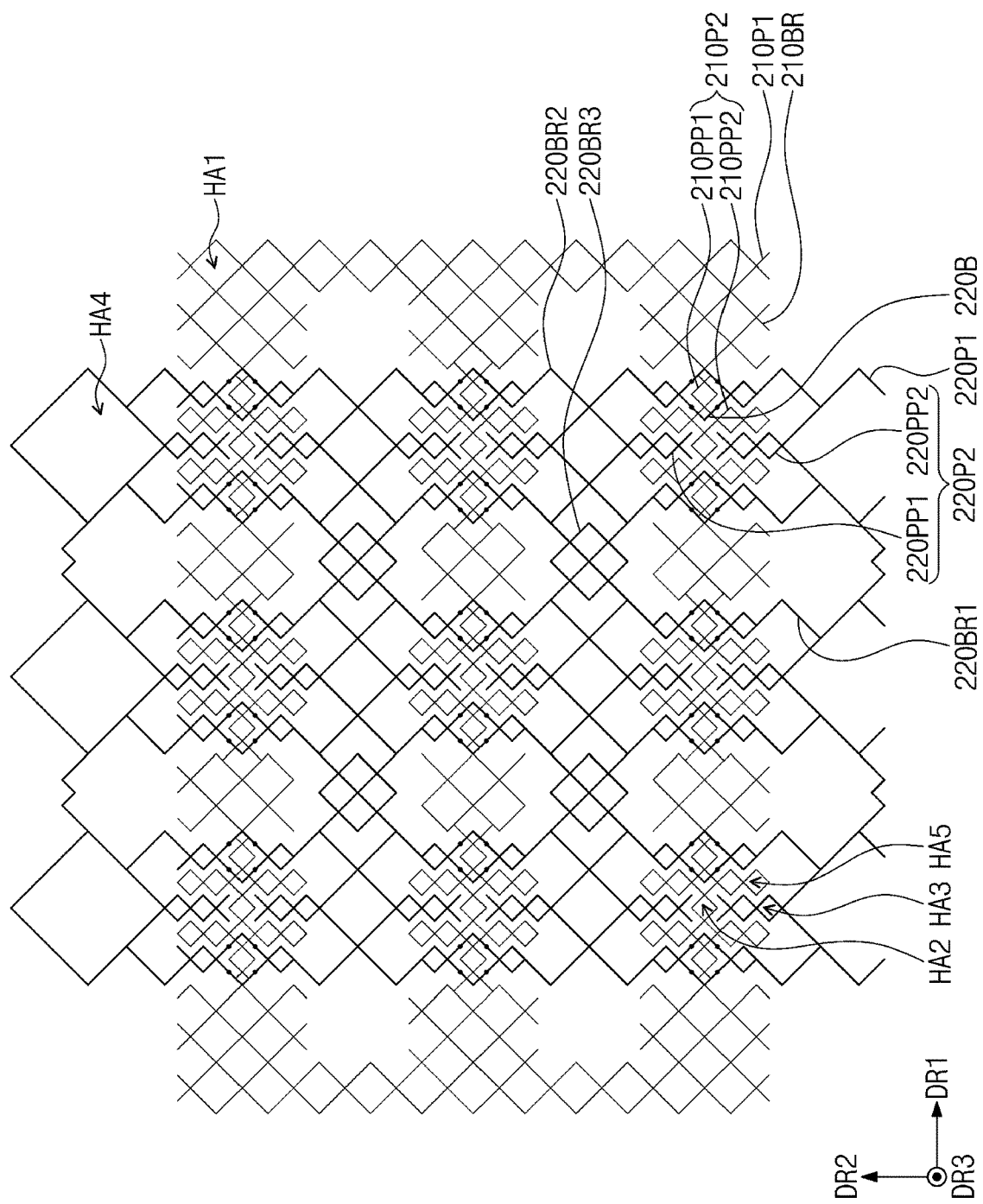
FIGS. 10-16 are plan views of the area 200U of FIG. 4 according to an embodiment of the inventive concept.

FIG. 10 is a plan view of the area 200U of FIG. 4 according to an embodiment of the inventive concept. In the description of FIG. 10, the same reference numerals are used for the components described through FIG. 7A, and description thereof may not be repeated.

Referring to FIGS. 4 and 10, each of the plurality of cross electrodes 220 may include a plurality of first cross portions 220P1, a plurality of second cross portions 220P2, a plurality of first cross branch portions 220BR1, a plurality of second cross branch portions 220BR2, a plurality of third cross branch portions 220BR3, and a plurality of bridge patterns 220B.

Each of the plurality of first cross portions 220P1 may branch into the plurality of first cross branch portions 220BR1. For example, one first cross portion 220P1 may be branched into three cross branch portions. A gap may be defined between the plurality of first cross branch portions 220BR1. The plurality of first cross branch portions 220BR1 may be arranged to be spaced from each other in the first direction DR1.

The plurality of second cross branch portions 220BR2 may be disposed between the plurality of second cross portions 220P2.

The plurality of third cross branch portions 220BR3 may be disposed between two second cross branch portions 220BR2 adjacent to each other in the first direction DR1. The plurality of third cross branch portions 220BR3 may be spaced from each other in the second direction DR2 with one of the plurality of branch portions 210BR therebetween. The plurality of third cross branch portions 220BR3 may be disposed adjacent to the plurality of branch portions 210BR, such that, in the first region AR1, a length of a boundary between the plurality of electrodes 210 and the plurality of cross electrodes 220, which face each other, may increase. According to the inventive concept, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

The plurality of second portions 210P2 and the plurality of second cross portions 220P2 may be disposed on a crossing area on which the plurality of electrodes 210 and the plurality of cross electrodes 220 are crossing with each other. A plurality of crossing areas on which the plurality of electrodes 210 and the plurality of cross electrodes 220 are crossing with each other may be provided. For example, nine crossing areas may be provided.

The plurality of first cross branch portions 220BR1, the plurality of second cross branch portions 220BR2, and the plurality of third cross branch portions 220BR3 may have a mesh structure.

Figure 11:
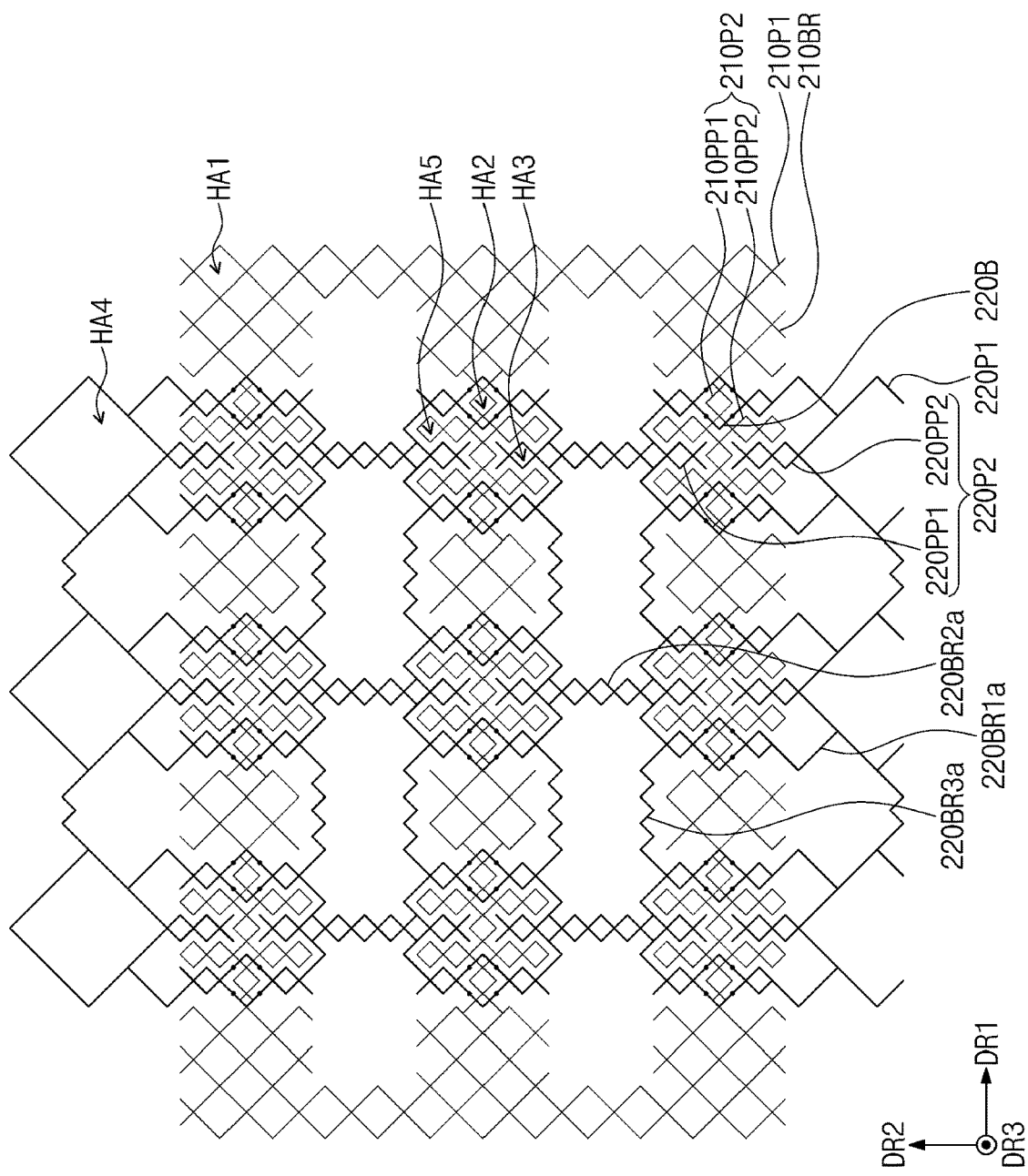

FIG. 11 is a plan view of the area 200U of FIG. 4 according to an embodiment of the inventive concept. In the following description of FIG. 11, the same reference numerals are used for the constituent elements described through FIG. 7A, and a description thereof may not be repeated.

Referring to FIGS. 4 and 11, each of the plurality of cross electrodes 220 may include a plurality of first cross portions 220P1, a plurality of second cross portions 220P2, a plurality of first cross branch portions 220BR1a, a plurality of second cross branch portions 220BR2a, a plurality of third cross branch portions 220BR3a, and a plurality of bridge patterns 220B.

Each of the plurality of first cross portions 220P1 may be branched into the plurality of first cross branch portions 220BR1a. For example, one first cross portion 220P1 may be branched into three cross branch portions. A gap may be defined between the plurality of first cross branch portions 220BR1a.

The plurality of second cross branch portions 220BR2a may be disposed between the plurality of second cross portions 220P2. The plurality of first cross branch portions 220BR1a and the plurality of second cross branch portions 220BR2a may have a mesh structure.

The plurality of third cross branch portions 220BR3a may be disposed between the two second cross pattern portions 220PP2 adjacent to each other in the first direction DR1. In one or more embodiments, the plurality of third cross branch portions 220BR3a may be disposed between the plurality of second cross branch portions 220BR2a. The plurality of third cross branch portions 220BR3a may be disposed adjacent to the plurality of branch portions 210BR. The plurality of third cross branch portions 220BR3a may have a zigzag shape. The plurality of third cross branch portions 220BR3a may be disposed adjacent to the plurality of branch portions 210BR, such that, in the first region AR1, a length of a boundary between the plurality of electrodes 210 and the plurality of cross electrodes 220, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

Each of the second opening HA2, the third opening HA3, and the fifth opening HA5, which are defined in the first region AR1 of the sensor layer 200, may be less in size than each of the first opening HA1 and the fourth opening HA4. For example, the second opening HA2 may be less in size than each of the first opening HA1 and the fourth opening HA4 individually on a plane or in a plan view, the third opening HA3 may be less in size than each of the first opening HA1 and the fourth opening HA4 individually on a plane or in a plan view, and the fifth opening HA5 may be less in size than each of the first opening HA1 and the fourth opening HA4 individually on a plane or in a plan view. The second portion 210P2 and the second cross portion 220P2 may be disposed adjacent to each other. The plurality of third cross branch portions 220BR3a may be interdigitated with the plurality of branch portions 210BR. According to the inventive concept, an amount of change in mutual capacitance between the plurality of electrodes 210 and the plurality of cross electrodes 220 may increase. Thus, the sensing sensitivity for the amount of change in mutual capacitance of the sensor layer 200 may be improved.

Figure 12:
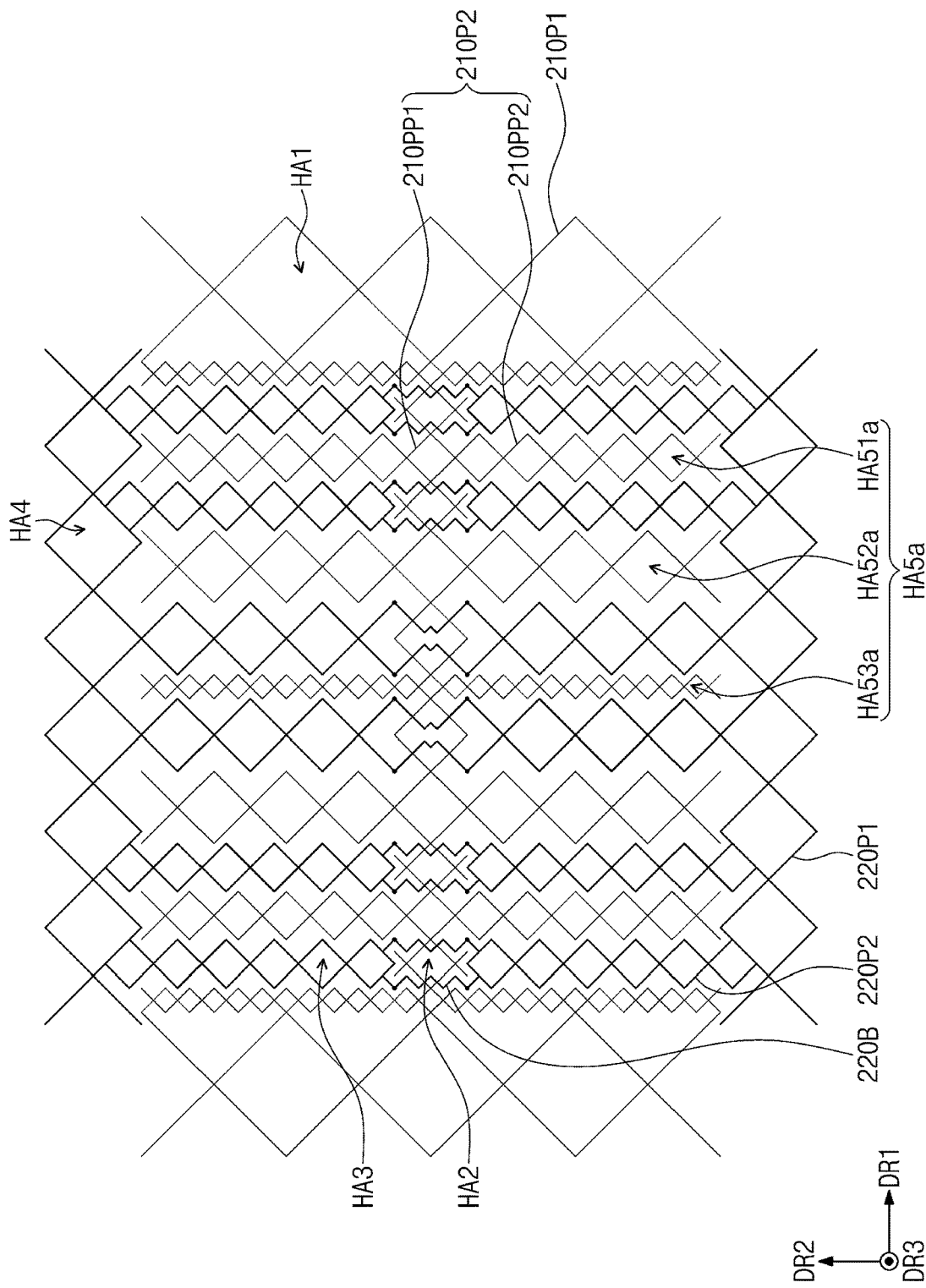

FIG. 12 is a plan view of the area 200U of FIG. 4 according to an embodiment of the inventive concept.

Referring to FIGS. 4 and 12, a fifth opening HA5a may be defined in each of the plurality of second pattern portions 210PP2. The fifth opening HA5a may have a size less than that of each of the first opening HA1 and the fourth opening HA4. The fifth opening HA5a may be referred to as a first pattern opening HA5a. The fifth opening HA5a may be provided in plurality. In one or more embodiments, the size of any one of the fifth openings HA51b, HA52b, and HA53b may be less than the size of each of the first opening HA1 and the fourth opening HA4 individually on a plane or in a plan view. The fifth openings HA51a, HA52a, and HA53a may have different sizes from each other. For example, one fifth opening HA51a may have a size less than that of another fifth opening HA52a and may have a size greater than that of another fifth opening HA53a.

In the first region AR1, the second portion 210P2 and the second cross portion 220P2 may be disposed adjacent to each other, such that a length of a boundary between the second portion 210P2 and the second cross portion 220P2, which face each other, may increase. Accordingly, the mutual capacitance between the plurality of electrodes 210 and the plurality of cross electrodes 220 may increase. As the mutual capacitance increases, the amount of change in mutual capacitance may increase. Thus, the sensing sensitivity of the sensor layer 200 may be improved.

Figure 13:
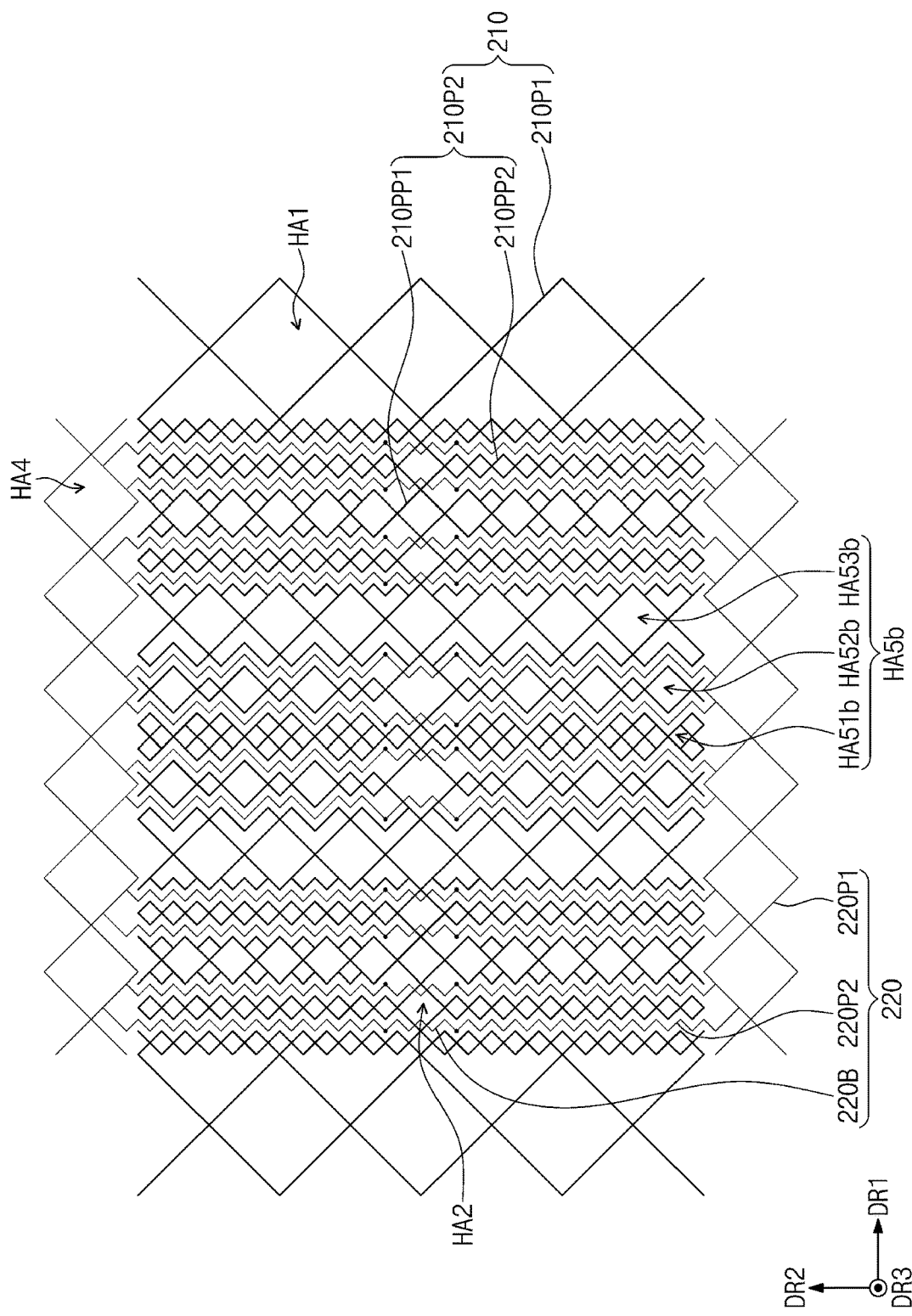

FIG. 13 is a plan view of the area 200U of FIG. 4 according to an embodiment of the inventive concept.

Referring to FIGS. 4 and 13, a fifth opening HA5b may be defined in each of the plurality of second pattern portions 210PP2. The fifth opening HA5b may have a size less than that of each of the first opening HA1 and the fourth opening HA4. The fifth opening HA5b may be provided in plurality. In one or more embodiments, the size of any one of the fifth openings HA51b, HA52b, and HA53b may be less than the size of each of the first opening HA1 and the fourth opening HA4 individually on a plane or in a plan view. The fifth openings HA51b, HA52b, and HA53b may have different sizes from each other. For example, one fifth opening HA51b may have a size less than that of another fifth opening HA52b, and another fifth opening HA52b may have a size less than that of another fifth opening HA53b.

The plurality of second cross portions 220P2 may be crossing with the plurality of second pattern portions 210PP2. For example, each of the plurality of second cross portions 220P2 may have a zigzag shape. The second portion 210P2 and the second cross portion 220P2 may be disposed adjacent to each other.

The plurality of first cross pattern portions 220PP1 and the plurality of second cross pattern portions 220PP2 may be connected (e.g., electrically connected) to each other through the plurality of bridge patterns 220B. For example, the plurality of first cross pattern portions 220PP1 and the plurality of second cross pattern portions 220PP2 may be connected (e.g., electrically connected) to each other through 12 bridge patterns 220B. Each of the bridge patterns 220B may have a zigzag shape. The 12 bridge patterns 220B may be disposed on the first region AR1.

Figure 14:
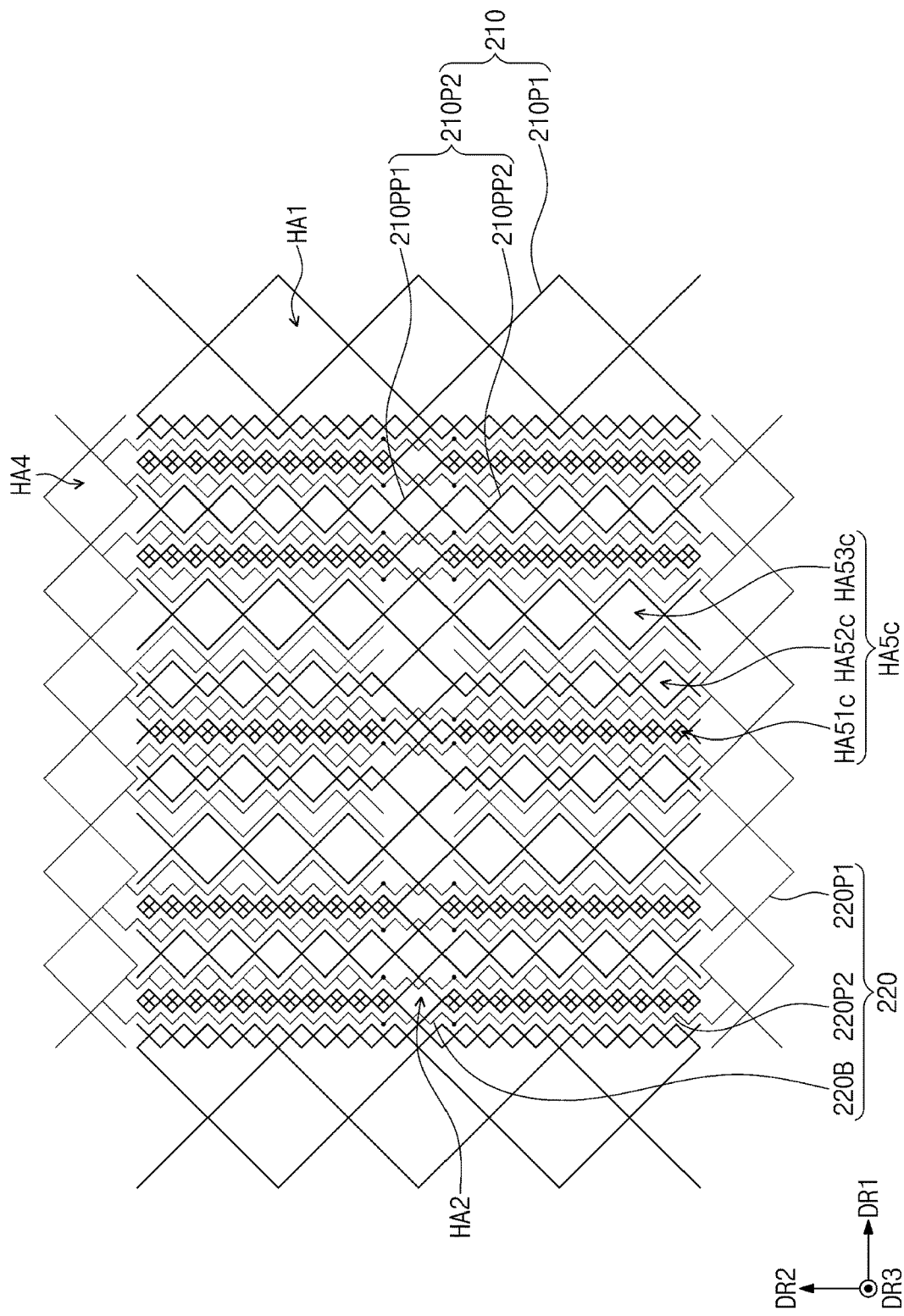

FIG. 14 is a plan view of the area 200U of FIG. 4 according to an embodiment of the inventive concept. In describing FIG. 14, the same reference numerals are used for the components described through FIG. 13, and descriptions thereof may not be repeated.

Referring to FIGS. 4 and 14, a fifth opening HA5c may be defined in each of the plurality of second pattern portions 210PP2. The fifth opening HA5c may have a size less than that of each of the first opening HA1 and the fourth opening HA4. The fifth opening HA5c may be provided in plurality. In one or more embodiments, the size of any one of the fifth openings HA51c, HA52c, and HA53c may be less than the size of each of the first opening HA1 and the fourth opening HA4 individually on a plane or in a plan view. The fifth openings HA51c, HA52c, and HA53c may have different sizes from each other. For example, one fifth opening HA51c may have a size less than that of another fifth opening HA52c, and another fifth opening HA52c may have a size less than that of another fifth opening HA53c. One emission area PXA (e.g., see FIG. 5C) may overlap the fifth opening HA51c.

The plurality of first cross pattern portions 220PP1 and the plurality of second cross pattern portions 220PP2 may be connected (e.g., electrically connected) through 10 bridge patterns 220B. Each of the bridge patterns 220B may have a zigzag shape. The 10 bridge patterns 220B may be disposed on the first region AR1.

Figure 15:
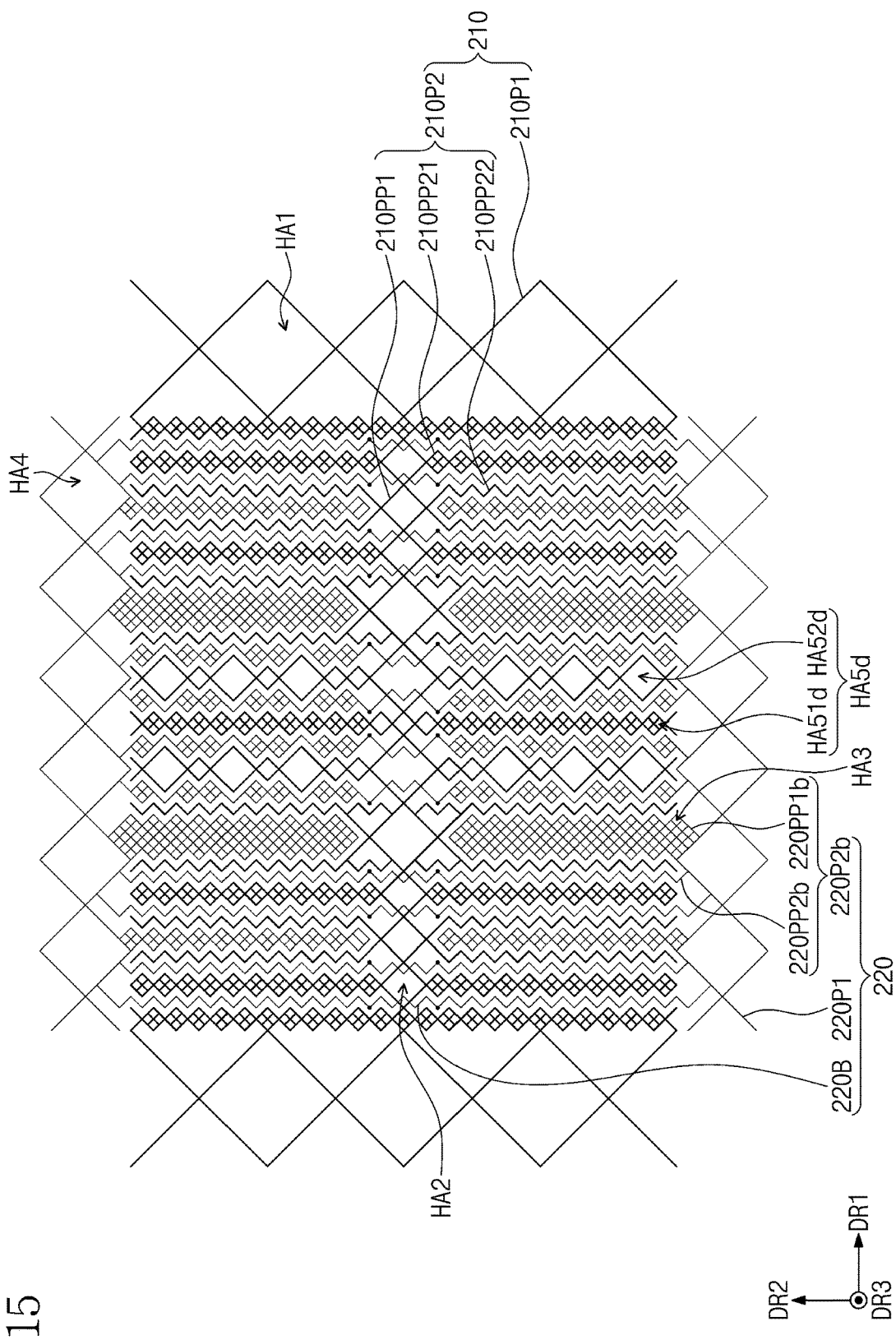

FIG. 15 is a plan view of the area 200U of FIG. 4 according to an embodiment of the inventive concept.

Referring to FIGS. 4 and 15, a fifth opening HA5d may be defined in each of the plurality of second pattern portions 210PP2. The fifth opening HA5d may have a size less than that of each of the first opening HA1 and the fourth opening HA4. The fifth opening HA5d may be provided in plurality. In one or more embodiments, the size of any one of the fifth openings HA51d and HA52d may be less than the size of each of the first opening HA1 and the fourth opening HA4 individually on a plane or in a plan view. The fifth openings HA51d and HA52d may have different sizes from each other. For example, one fifth opening HA51d may have a size less than that of another fifth opening HA52d. One emission area PXA (e.g., see FIG. 5C) may overlap the fifth opening HA51d.

The plurality of second cross portions 220P2b may include a plurality of first cross pattern portions 220PP1b and a plurality of second cross pattern portions 220PP2b. The plurality of first cross pattern portions 220PP1b and the plurality of second cross pattern portions 220PP2b may be spaced from each other with the plurality of second pattern portions 210PP2 therebetween.

Each of the plurality of first cross pattern portions 220PP1b and each of the plurality of second cross pattern portions 220PP2b may have shapes different from each other. The plurality of second pattern portions 210PP21 and 210PP22 may have shapes different from each other.

A third opening HA3 may be defined in each of the plurality of first cross pattern portions 220PP1b. One emission area PXA (e.g., see FIG. 5C) may overlap the third opening HA3. The plurality of first cross pattern portions 220PP1b may be interdigitated with the plurality of second pattern portions 210PP21. The plurality of second pattern portions 210PP21 may have a zigzag shape.

A fifth opening HA5 may be defined in each of the plurality of second pattern portions 210PP22. One emission area PXA (e.g., see FIG. 5C) may overlap the fifth opening HA5. The plurality of second pattern portions 210PP22 may be interdigitated with the plurality of second cross pattern portions 220PP2b. The plurality of second cross pattern portions 220PP2b may have a zigzag shape.

Figure 16:
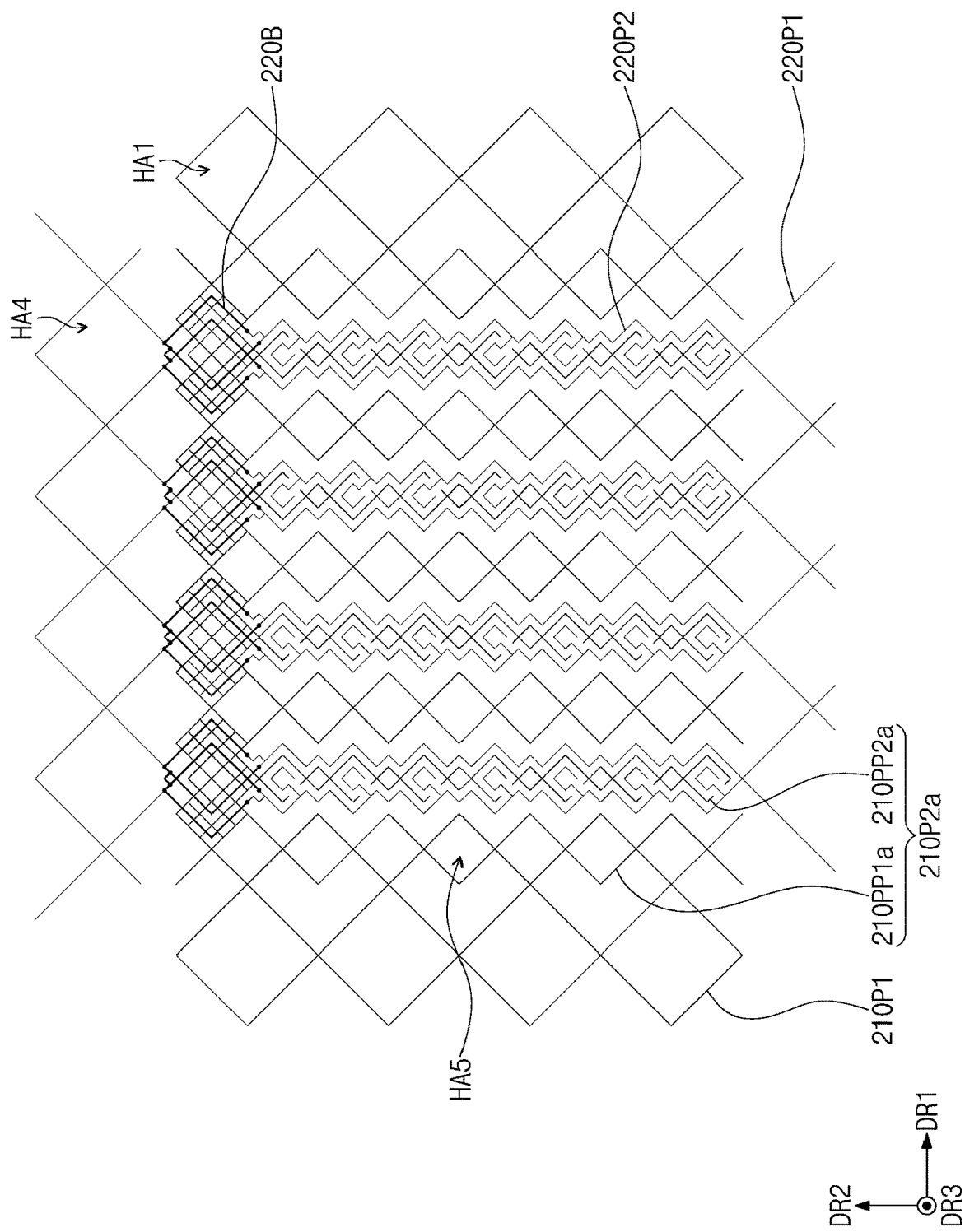

FIG. 16 is a plan view of the area 200U of FIG. 4 according to an embodiment of the inventive concept.

Referring to FIGS. 4 and 16, the plurality of second portions 210P2a may include a plurality of first pattern portions 210PP1a and a plurality of second pattern portions 210PP2a. The plurality of first pattern portions 210PP1a and the plurality of second pattern portions 210PP2a may be spaced from each other with the plurality of second cross portions 220P2 therebetween.

Each of the plurality of first pattern portions 210PP1a and each of the plurality of second pattern portions 210PP2a may be different from each other. A fifth opening HA5 may be defined in each of the plurality of first pattern portions 210PP1a. The fifth opening HA5 may have a size less than that of each of the first opening HA1 and the fourth opening HA4. For example, the size of the fifth opening HA5 may be less than the size of each of the first opening HA1 and the fourth opening HA4 individually on a plane or in a plan view. The plurality of second pattern portions 210PP2a may be interdigitated with the plurality of second cross portions 220P2. The plurality of second cross portions 220P2 may surround the plurality of second pattern portions 210PP2a.

The plurality of first cross portions 220P1 and the plurality of second cross portions 220P2 may be connected (e.g., electrically connected) to each other through the plurality of bridge patterns 220B. The plurality of bridge patterns 220B may be disposed adjacent to one side of one of the plurality of first cross portions 220P1 and may be disposed spaced from the other side of the other of the plurality of first cross portions 220P1.

According to the inventive concept, the area on which the size of the opening defined in each of the electrode and the cross electrode on the area adjacent to the area on which the electrode and the cross electrode are crossing to be insulated from each other may be greater than that the opening defined in each of the electrode and the cross electrode on the area on which the electrode and the cross electrode are crossing to be insulated from each other. As the size of the opening in the area adjacent to the area on which the electrode and the cross electrode are crossing to be insulated from each other increases, the parasitic capacitance value generated in each of the electrode and the cross electrode may be reduced. Therefore, the ratio of the amount of change in capacitance to the reference value may increase, and the sensing sensitivity of the sensor layer with respect to the amount of change in capacitance may be improved.

According to the inventive concept, the electrode and the cross electrode may be disposed adjacent to each other on the area on which the electrode and the cross electrode are interdigitated to be insulated from each other. The mutual capacitance between the electrode and the cross electrode may increase. As the mutual capacitance increases, the amount of change in mutual capacitance may increase. Therefore, the sensing sensitivity of the sensor layer may be improved.

It will be apparent to those skilled in the art that various modifications and variations can be made in the inventive concept. Thus, it is intended that the present disclosure covers the modifications and variations of this disclosure provided they come within the scope of the appended claims and their equivalents. Hence, the real protective scope of the inventive concept shall be determined by the technical scope of the accompanying claims, and equivalents thereof.

What is claimed is:

1. An electronic device comprising:
    a display layer; and
    a sensor layer on the display layer, the sensor layer comprising an electrode and a cross electrode crossing the electrode,
    wherein the electrode comprises a plurality of first portions spaced from each other in a first direction and a plurality of second portions between the plurality of first portions,
    wherein the cross electrode comprises a plurality of first cross portions spaced from each other in a second direction crossing the first direction and a plurality of second cross portions between the plurality of first cross portions,
    wherein the plurality of second portions comprises a first pattern portion extending in the first direction and a plurality of second pattern portions extending in the second direction,
    wherein a first opening is in the plurality of first portions,
    wherein a second opening is in the first pattern portion, and
    wherein a size of the first opening is greater than a size of the second opening.

2. The electronic device of claim 1, wherein the plurality of first portions, the plurality of second portions, the plurality of first cross portions, and the plurality of second cross portions have a mesh structure.

3. The electronic device of claim 1, wherein the plurality of second cross portions comprises:
    a plurality of first cross pattern portions adjacent to one side of one of the plurality of first cross portions, the plurality of first cross pattern portions extending in the second direction; and
    a plurality of second cross pattern portions adjacent to an other side of an other one of the plurality of first cross portions, the plurality of second cross pattern portions extending in the second direction.

4. The electronic device of claim 3, wherein the plurality of first cross pattern portions and the plurality of second pattern portions are alternately arranged in the first direction, and
    wherein the plurality of second cross pattern portions and the plurality of second pattern portions are alternately arranged in the first direction.

5. The electronic device of claim 4, wherein the cross electrode further comprises a bridge pattern at a different layer than the plurality of first cross portions and the plurality of second cross portions, and
    wherein the bridge pattern overlaps the first pattern portion in a plan view.

6. The electronic device of claim 4, wherein a plurality of first pattern openings are in the plurality of first cross pattern portions, and
    wherein the plurality of first pattern openings are different in size from each other.

7. The electronic device of claim 4, wherein the plurality of first cross pattern portions and the plurality of second cross pattern portions are symmetrical to each other with respect to an axis extending in the first direction.

8. The electronic device of claim 1, wherein the plurality of second cross portions is interdigitated with the plurality of second pattern portions.

9. The electronic device of claim 1, wherein the plurality of second pattern portions are symmetrical to each other with respect to an axis extending in the second direction.

10. The electronic device of claim 1, wherein the plurality of second cross portions comprises a first cross pattern portion and a second cross pattern portion spaced from the first cross pattern portion with one of the plurality of second pattern portions therebetween, and
    wherein the first cross pattern portion and the second cross pattern portion are different in shape from each other.

11. The electronic device of claim 1, wherein the display layer comprises a plurality of emission areas, and
    wherein the second opening overlaps at least four or more emission areas of the plurality of emission areas in a plan view.

12. The electronic device of claim 1, wherein the plurality of second cross portions do not overlap the second opening in a plan view.

13. The electronic device of claim 12, wherein a third opening is in the plurality of second cross portions, and
    wherein the plurality of second portions do not overlap the third opening in the plan view.

14. The electronic device of claim 1, wherein the plurality of second pattern portions protrudes from the first pattern portion in the second direction.

15. The electronic device of claim 1, wherein the electrode further comprises a plurality of branch portions branched from the plurality of first portions, and
wherein the plurality of branch portions are spaced from each other with the plurality of second portions therebetween.

16. The electronic device of claim 15, wherein the electrode further comprises a plurality of third portions spaced from the plurality of second portions with the plurality of first portions therebetween, and
wherein each of the plurality of third portions has the same width as each of the plurality of branch portions.

17. The electronic device of claim 15, wherein the electrode further comprises a plurality of third portions spaced from the plurality of second portions with the plurality of first portions therebetween, and
wherein each of the plurality of third portions has a width less than that of each of the plurality of first portions.

18. The electronic device of claim 15, wherein the cross electrode further comprises:
a plurality of first cross branch portions branched from the plurality of first cross portions;
a plurality of second cross branch portions between the plurality of second cross portions; and
a plurality of third cross branch portions between the plurality of second cross branch portions.

19. The electronic device of claim 18, wherein the plurality of third cross branch portions are adjacent to the plurality of branch portions.

20. An electronic device comprising:
a display layer; and
a sensor layer on the display layer, the sensor layer comprising an electrode and a cross electrode crossing the electrode,
wherein a first region, a second region adjacent to the first region in a first direction, and a third region adjacent to the first region in a second direction crossing the first direction are in the sensor layer,
wherein the electrode and the cross electrode cross each other in the first region and are insulated from each other,
wherein a first opening is in a first portion of the electrode located in the first region, and
wherein a size of a second opening is greater than a size of the first opening, the second opening being in a second portion of the electrode located in the second region.

21. The electronic device of claim 20, wherein a third opening is in a third portion of the cross electrode located in the first region, and
wherein a size of a fourth opening is greater than a size of the third opening, the fourth opening being in a fourth portion of the cross electrode located in the third region.

22. The electronic device of claim 21, wherein the first portion of the electrode comprises:
a first pattern portion extending in the first direction; and
a plurality of second pattern portions extending from the first pattern portion in the second direction.

23. The electronic device of claim 22, wherein the third portion of the cross electrode comprises:
a plurality of first cross pattern portions adjacent to the cross electrode disposed in the third region to extend in the second direction; and
a plurality of second cross pattern portions spaced from each other in the second direction with the plurality of first cross pattern portions and the first pattern portion therebetween.

24. The electronic device of claim 23, wherein the plurality of first cross pattern portions are spaced from each other in the first direction with the plurality of second pattern portions therebetween, and
wherein the plurality of second cross pattern portions are spaced from each other in the first direction with the plurality of second pattern portions therebetween.

25. The electronic device of claim 23, wherein the third portion of the cross electrode further comprises a bridge pattern, and
wherein the bridge pattern overlaps the first pattern portion in a plan view.

26. The electronic device of claim 21, wherein the third portion of the cross electrode does not overlap the first opening in a plan view.

* * * * *